United States Patent
Holmes

(10) Patent No.: US 6,707,594 B2
(45) Date of Patent: Mar. 16, 2004

(54) METHOD AND DEVICE FOR SWITCHING WAVELENGTH DIVISION MULTIPLEXED OPTICAL SIGNALS USING TWO-DIMENSIONAL MICRO-ELECTROMECHANICAL MIRRORS

(75) Inventor: Richard B. Holmes, Cameron Park, CA (US)

(73) Assignee: General Nutronics, Inc., Milpitas, CA (US)

( * ) Notice: Subject to any disclaimer, the term of this patent is extended or adjusted under 35 U.S.C. 154(b) by 47 days.

(21) Appl. No.: 10/144,171

(22) Filed: May 10, 2002

(65) Prior Publication Data

US 2003/0007234 A1 Jan. 9, 2003

Related U.S. Application Data

(63) Continuation-in-part of application No. 09/826,982, filed on Apr. 4, 2001, now Pat. No. 6,532,115, which is a continuation-in-part of application No. 09/716,196, filed on Nov. 17, 2000, now Pat. No. 6,313,936, which is a continuation-in-part of application No. 09/666,898, filed on Sep. 20, 2000, now Pat. No. 6,580,845.

(51) Int. Cl.⁷ .......................... G02B 26/00; G02B 6/26; H04J 14/00; H04B 10/20
(52) U.S. Cl. .......................... 359/291; 398/45; 398/48; 385/18
(58) Field of Search .................. 359/291, 634; 385/17, 18; 398/45, 48, 58

(56) References Cited

U.S. PATENT DOCUMENTS

| | | | | |
|---|---|---|---|---|
| 5,317,445 A | * | 5/1994 | DeJule et al. | 359/250 |
| 6,097,859 A | | 8/2000 | Solgaard et al. | 385/17 |
| 6,313,936 B1 | * | 11/2001 | Holmes | 359/250 |
| 6,335,782 B1 | * | 1/2002 | Holmes | 359/250 |
| 6,356,679 B1 | * | 3/2002 | Kapany | 385/18 |
| 6,532,115 B2 | * | 3/2003 | Holmes | 359/722 |
| 6,538,818 B2 | * | 3/2003 | Holmes | 359/618 |
| 6,539,138 B2 | * | 3/2003 | Holmes | 385/16 |
| 6,580,845 B1 | * | 6/2003 | Holmes | 385/16 |
| 2002/0054418 A1 | * | 5/2002 | Holmes | 359/250 |
| 2003/0007234 A1 | * | 1/2003 | Holmes | 359/290 |

\* cited by examiner

*Primary Examiner*—David N. Spector
(74) *Attorney, Agent, or Firm*—Ryan A. Heck; Ian F. Burns & Associates

(57) ABSTRACT

A switch device and method is disclosed that is capable of switching wavelength division multiplexed optical signals. The device comprises a switch element that includes a two-dimensional micro-electromechanical mirror. The two-dimensional micro-electromechanical mirror is adapted to reflect an optical signal so that it is directed to a selected target. The switch element may also comprise a beam splitter and a plurality of wave plates. The beam splitter is adapted to transmit light in one polarization and reflect light in another polarization. The wave plates are adapted to change the polarization of the light so that the beam splitter either reflects or transmits the light.

19 Claims, 17 Drawing Sheets

SIDE VIEW OF FIRST BANK 25 SIMILAR BANKS BEHIND THIS PLANE

METHOD AND DEVICE FOR SWITCHING WAVELENGTH DIVISION MULTIPLEXED OPTICAL SIGNALS USING TWO-DIMENSIONAL MICRO-ELECTROMECHANICAL MIRRORS

CROSS REFERENCE TO RELATED APPLICATIONS

This application is a continuation-in-part application of U.S. patent application Ser. No. 09/826,982, filed on Apr. 4, 2001, now U.S. Pat. No. 6,532,115 incorporated herein by reference, which is a continuation-in-part application of U.S. patent application Ser. No. 09/716,196, filed Nov. 17, 2000, now U.S. Pat. No. 6,313,936. U.S. Pat. No. 6,313,936 is a continuation-in-part application of U.S. patent application Ser. No. 09/666,898 filed on Sep. 20, 2000 now U.S. Pat. No. 6,580,845.

BACKGROUND OF THE INVENTION

1. Field of Invention

The present invention relates to optical switching and, more particularly, to an optical switching system, device, and method using two-dimensional micro-electromechanical mirrors.

2. Description of Related Art

Optical communication systems are a substantial and rapidly growing part of communication networks. The expression "optical communication system," as used herein, relates to any system that uses optical signals to convey information across an optical transmission device, such as an optical fiber. Such optical systems may include, but are not limited to telecommunication systems, cable television systems, and local area networks (LANs).

While the need to carry greater amounts of data on optical communication systems has increased, the capacity of existing transmission devices is limited. Although capacity may be expanded, e.g., by laying more fiber optic cables, the cost of such expansion is prohibitive. Consequently, there exists a need for a cost-effective way to increase the capacity of existing optical transmission devices.

Wavelength division multiplexing (WDM) has been adopted as a means to increase the capacity of existing optical communication systems. In a WDM system, plural optical signals are carried over a single transmission device, each channel being assigned a particular wavelength.

An essential part of optical communication systems is the ability to switch or route signals from one transmission device to another. For example, micro-electromechanical mirrors (MEMs) have been developed for routing signals between transmission devices. A discussion of MEM devices can be found in K. E. Peterson, "Micromechanical Light Modulator Array Fabricated on Silicon," Applied Physics Letters, Volume 31, Page 521 (1977). This technique operates by changing the angular orientation of the mirrors, thereby reflecting signals to different locations.

Designers have also considered using bubbles that are capable of changing their internal reflection for switching optical signals. A discussion of this can be found in "Compact Optical Cross-connect Switch Based on Total Internal Reflection in a Fluid-containing Planar Lightwave Circuit," by J. E. Fouquet, in *Trends in Optics and Photonics Series*, A. Sawchuk, ed., Vol. 37, (Optical Society of America, Washington, D.C., 2000) pp. 204–206. However, these techniques are unable to switch between multiple wavelengths. Furthermore, both of these devices have limited switching speeds, in the range of 10 kHz for the mirror devices and in the range of 100 Hz for the bubble devices.

Zigzag multiplexers are also well known in the art for transmitting signals on multiple transmission devices. For example, U.S. Pat. No. 6,008,920 discloses a multiplexer/demultiplexer device utilizing a filter that is sensitive to the angle of incidence of light. However, such multiplexers have not been used for switching or routing applications in conjunction with arrays of fibers, detectors, and emitters.

Other switching approaches, such as the approach disclosed in U.S. Pat. No. 4,769,820, issued to Holmes, can switch data at GHz rates, which is effectively switching at GHz transition rates. However, this approach requires substantial optical switching power, has potential cross talk, and cannot resolve wavelength over-utilization issues. What is needed is a means for switching wavelength division multiplexed signals that is capable of doing so at high speeds with no cross talk and requires low switching power. What is also needed is a switch device that is capable of switching large numbers of signals.

SUMMARY OF INVENTION

1. Advantages of the Invention

One or more embodiments of the present invention may achieve, but do not necessarily achieve, one or more of the following advantages:

the ability to switch signals of different wavelengths;

the ability to switch signals at high speeds;

does not require high power;

has low crosstalk;

the ability to switch between wavelengths and fibers to avoid transmission device or wavelength over-utilization;

the ability to broadcast to multiple transmission devices or couplers simultaneously; and the ability to efficiently switch a large volume of signals.

These and other advantages of certain embodiments of the present invention may be realized by reference to the remaining portions of the specification, claims, and abstract.

2. Brief Description of One Embodiment of the Present Invention

The present invention comprises an optical switch element for use with at least one source and a plurality of targets. The source is adapted to transmit an optical signal to the optical switch device. The targets are adapted to receive the optical signal from the optical switch device.

The optical switch device comprises a beam splitter, a first wave plate, a direction altering device, and a second wave plate. The beam splitter is adapted to transmit light in a first predetermined polarization and reflect light in a second predetermined polarization. The first wave plate is positioned between the source and the beam splitter. The first wave plate is adapted to alter the polarization so that it is reflected by the beam splitter, wherein light transmitted by the source passes through the wave plate and is reflected by the beam splitter.

The direction altering device is positioned to receive light reflected by the beam splitter and to selectively reflect light to a plurality of paths, the paths corresponding to the positions of the plurality of targets. The second wave plate is positioned between the direction altering device and the beam splitter. The second wave plate is adapted to alter the polarization so that it is transmitted by the beam splitter, wherein light redirected by the direction-altering device passes through the second wave plate and is transmitted by the beam splitter.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION OF THE PREFERRED EMBODIMENTS

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Switch Device

Figure 1:
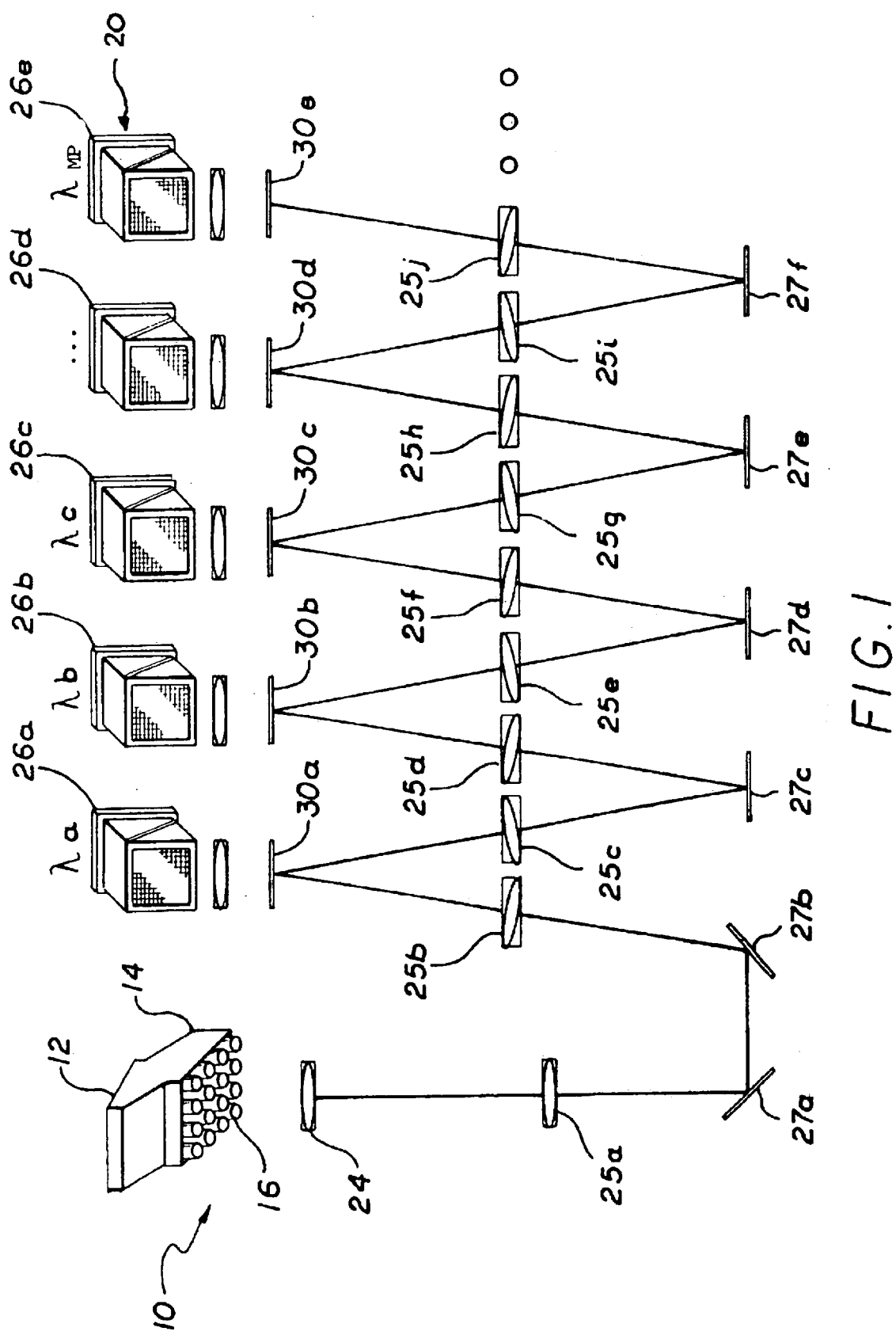
FIG. 1 is substantially a schematic diagram of one embodiment of a switch device of the present invention.

As seen in FIG. 1, the present invention comprises a switch device generally indicated by reference number 10. Switch device 10 may be used in almost any optical communication system. Switch device 10 comprises sources and targets 12 and at least one switch element 26. Sources and targets 12 comprise a source of incoming light signals and targets on to which switch array 20 transmits outgoing signals. Sources and targets 12 may be the same or different devices or objects. In the example shown in FIG. 1, sources and targets 12 are optical fibers 14. However, many other devices and transmission mediums may be used. Sources and targets 12 may include any number of fibers 14 and may use many different types of fibers. Each optical fiber 14 comprises an end 16. Ends 16 are preferably arranged in a two dimensional array, wherein the ends are substantially planar. It is recognized that the array may have many different configurations, such as the square array shown in FIG. 1.

As an optical signal enters switch device 10 it is transmitted from fiber end 16 through a collimating lens 24. Collimating lens 24 collimates the light and transmits the signal to imaging lens 25a. Imaging lens 25a, together with other lenses, images the optical signal on to a bandpass filter 30. In the configuration illustrated in FIG. 1, one or more reflection devices or mirrors 27a and 27b are provided for directing the optical signal to the switch elements 26. As will be discussed below, this configuration may allow switch device 10 to be connected to additional switch devices, each switch device being adapted to handle a set or range of wavelengths. However, it is recognized that the fibers 14 may be positioned differently to direct optical signals to switch elements 26 without the need for mirrors 27a and 27b.

After the optical signal is reflected by mirrors 27a and 27b, the signal passes through imaging lens 25b, which, together with imaging lens 25a, images the signal on a beam splitter or bandpass filter 30a. Bandpass filter 30a is preferably a narrow band filter that is adapted to allow light within a predetermined range of wavelengths to pass through the filter and reflect light outside the range of wavelengths. Such bandpass filters are available from JDS Uniphase in Santa Clara, Calif. The range of wavelengths is selected to correspond to the range of wavelengths in which switch element 26a is designed to operate. Since many bandpass filters are sensitive to the angle of incidence, in this embodiment each bandpass filter 30 preferably receives the optical signal at nearly normal incidence. The configuration of the components of switch device 10 allows for each bandpass filter 30 to be placed at near normal incidence. The particular form of imaging, mentioned above, ensures that the phase at each bandpass filter 30 does not have additional focus, which would further degrade throughput because of the filter's angular sensitivity. This particular form of imaging may include 4-f or telecentric imaging, known to those skilled in the art.

If the incoming optical signal is not within the range of wavelengths bandpass filter 30a is adapted to transmit, the signal is reflected to a second bandpass filter 30b and corresponding switch element 26b. In the configuration shown in FIG. 1, additional imaging lenses 25c and 25d and a mirror 27c are provided for facilitating the transmission of the signal to the subsequent switch element 26b. Together, imaging lenses 25c and 25d, which preferably incorporate a 4-f lens design or a suitable generalization that permits magnification, image the optical signal on to bandpass filter 30b. This process of transmission or reflection is then repeated for each subsequent switch element 26c–e. In this way, each switch element 26 receives signals in a range of wavelengths that it is intended to receive and signals outside of that range are reflected to other switch elements.

This configuration allows switch elements 26 to be placed side by side in a vertical configuration. This achieves several advantages. First, because bandpass filters 30 are transmissive in this design, dispersion, and attenuation are minimized for the reflected light that is incident on many filters in sequence. Second, the approach shown in FIG. 1 uses filters that are ostensibly at shallow angles, which decreases undesirable angular sensitivity. Third, the approach shown in FIG. 1 reduces cross talk from off-axis light.

The components of the present invention may be grouped into imaging units that, for example, comprise a switch element 26a, bandpass filter 30a, and imaging lenses 25b and 25c. Imaging units may be packaged individually and installed and maintained separately.

Switch Element

Figure 2:
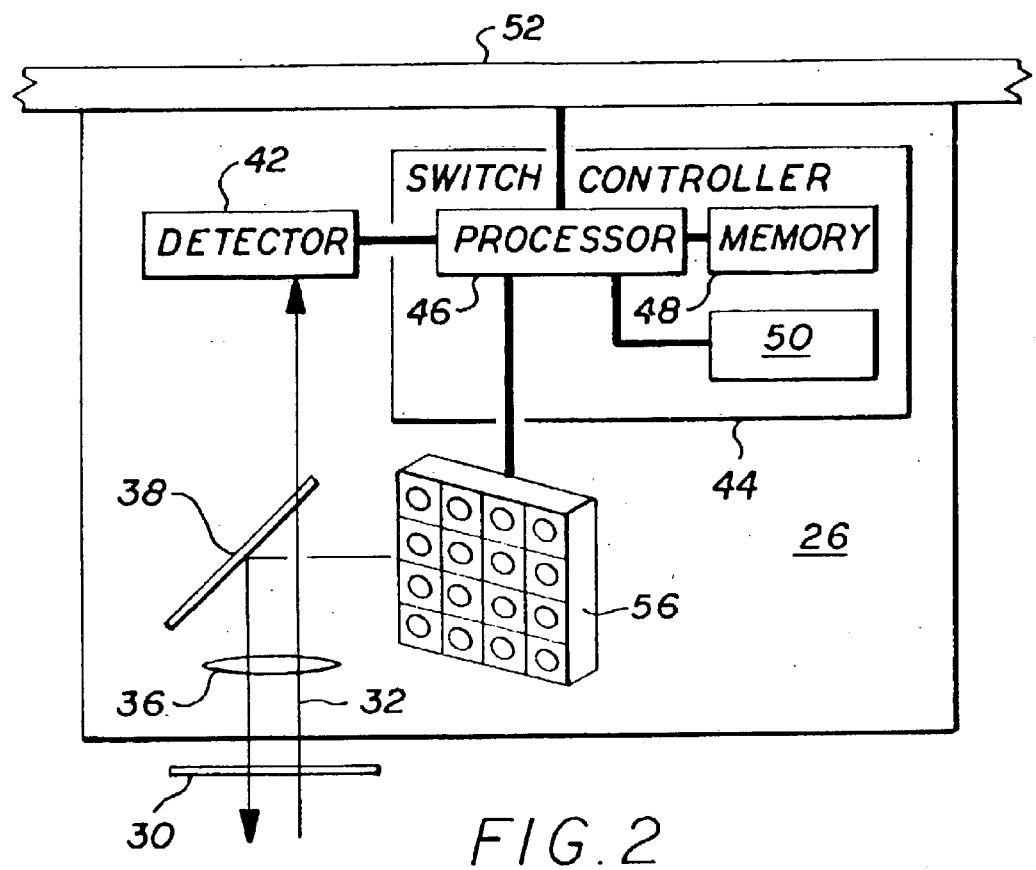
FIG. 2 is substantially a schematic diagram of one embodiment of a switch element of the present invention.
Figure 3:
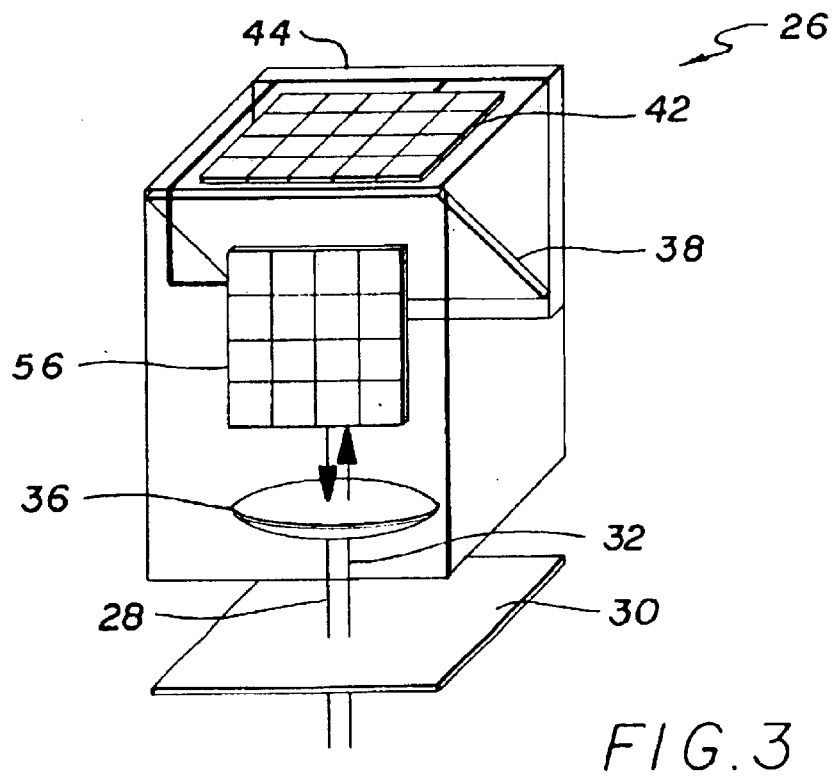
FIG. 3 is substantially a schematic diagram of one embodiment of a switch element of the present invention illustrating one possible physical configuration of the switch element.

Turning to FIGS. 2 and 3, each switch element 26 is arranged to receive incoming light 32 from bandpass filter 30. As incoming light 32 enters switch element 26, it is directed through an focussing lens 36 that focuses light signals on various components. In one embodiment, light 32 then falls on beam splitter 38. Beam splitter 38 allows light 32 to pass to detector array 42. Detector array 42 is adapted to detect signals in light 32 and generate electrical signals based on the light signals. Detector array 42 may comprise many different well known devices, such as 2609C Broadband Photodiode Module for both 1310 and 1550 nm detection available from Lucent Technologies or InGaAs p-i-n photodiodes for 1000–1700 nm detection, Part C30641E, available from EG&G. The electrical signals are transmitted to switch controller 44.

Switch controller 44 comprises a microprocessor 46 and memory 48. Microprocessor 46 is adapted to determine the intended destination of the light signal and route the signal to an appropriate fiber. Microprocessor 46 may be any of a number of devices that are well known in the art. For example, microprocessor 46 may be an Intel Pentium III or other similar processor. Memory 48 is preferably random access memory that also may be any of a number of devices that are well known in the art. Switch controller 44 may also comprise non-volatile memory 50 that may contain programming instructions for microprocessor 46.

Each light signal preferably carries a header that contains information that either identifies the signal or indicates its intended destination. This header information may be carried on a separate "control channel," which may be a particular predetermined fiber or wavelength. Switch controller 44 is adapted to read the header. Switch controller 44 may be adapted, either alone or in coordination with other devices, to determine the destination of the light signal. In order to avoid contention for the same wavelength on the same optical fiber, which would result in interference when the signals are received, it may be necessary for each switch controller 44 to coordinate with other switch controllers. This may be facilitated by bus 52. Bus 52 is connected to each switch element 26 and it allows each switch element to communicate with a central controller 54 (not shown in FIG. 4).

Figure 4:
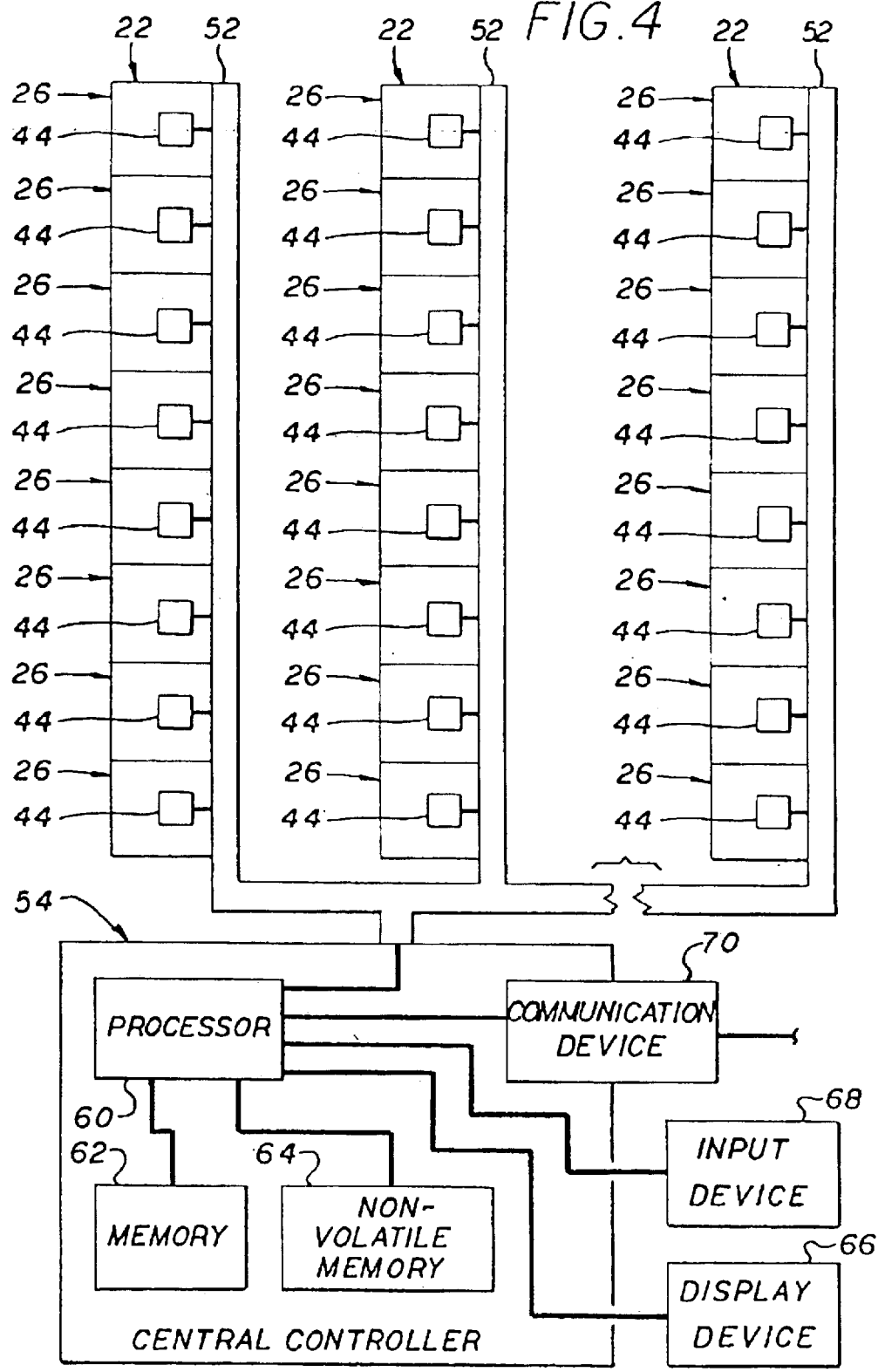
FIG. 4 is substantially a schematic diagram of one embodiment of the present invention in which a central processor is in communication with a plurality of switch elements.

As seen in FIG. 4, central controller 54 is in communication with each bus 52 of each set 22 of switch elements 26. This allows central controller 54 to receive signals from each switch element 26. Central controller 54 may comprise a processor 60 that is adapted to perform computer operations. Processor 60 is in communication with memory device 62, which may be random access memory (RAM), and non-volatile memory 64, which is adapted to store data when power to controller 54 is interrupted. Non-volatile memory 64 may be many different kinds of memory devices, such as a hard disk drive, flash memory, or erasable programmable read only memory (EPROM). Central controller 54 may be in communication with a display device 66, such as a monitor or printer, and input device 68, such as a keyboard. Display device 66 and input device 68 are adapted to allow an operator or user to communicate with switch device 10 (see FIG. 1).

Central controller 54 may also comprise a communication device 70, which may be external or internal. Communication device 70 is adapted to allow central controller 54 to communicate with other devices, such as other central processors or a computer that controls the optical system. Communication device 70 may be many different types of devices that are well known in the art, such as a modem, a network card, or a wireless communication device.

Central controller 54 may utilize a number of different techniques for resolving conflicts between switch elements. These may include the methods discussed in co-pending patent application Ser. No. 09/666,898, filed Sep. 20, 2000. Alternatively, each switch element 26 may be adapted to resolve conflicts or interferences internally. Switch controller 44 may have its own destination table and transmission table, and it can be programmed to manage signals entering switch element 26. If each switch element 26 is assigned to handle a specific wavelength or range of wavelengths, coordination between switch elements may not be necessary. However, some degree of coordination may be desirable.

Therefore, a relatively low-bandwidth data connection to central processor 54 (see FIG. 3) may be provided.

It is also recognized that it may be desirable to provide some form of communication device, such as bus 52, to update switch controller 44. For example, if a fiber has been disconnected from the network, switch controller 44 would need to be informed that this fiber is no longer available for transmission. In addition, switch element 26 may also be a node from which data is downloaded. This would necessitate transmission of data from each switch element 26 to another device to make use of the information.

In switch mode, once controller 44 has determined the destination of the optical signal, the controller causes at least one emitter in emitter array 56 to transmit an outgoing signal 28. The position of the emitter corresponds the position of the target of the signal. Outgoing optical signal back along the general path of the incoming signal. Returning to FIG. 1, in the case of switch element 26a, outgoing signal 28 passes through bandpass filter 30a, imaging lens 25b, mirrors 27a and 27b, imaging lens 25 and, collimating lens 24 and is received by at least one target 12.

It is also recognized that a plurality of detector and emitter arrays may be used in one switch element to detect and emit a plurality of wavelengths. This would allow one switch element to perform the same function of an array of switch elements. Thus, the switch device of the present invention may comprise only a single switch element. The same result could be obtained by using single detector and emitter arrays that are adapted to detect and emit a plurality of wavelengths.

Single Source Emitter Switch Element

Figure 5:
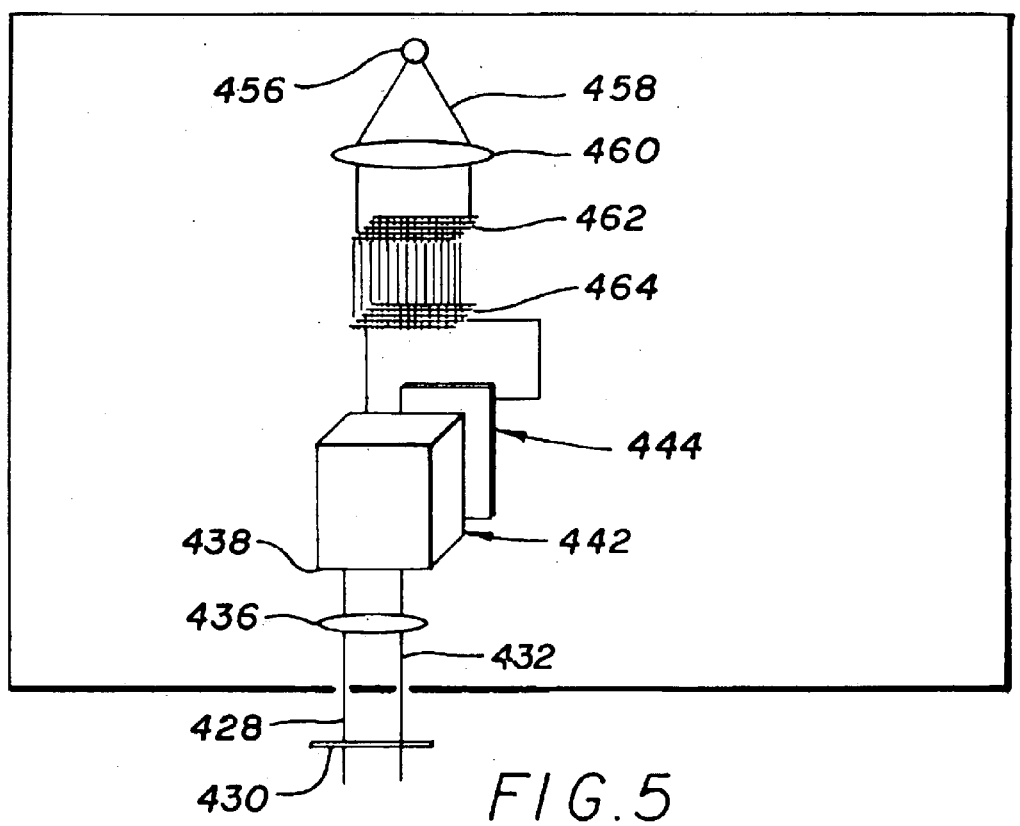
FIG. 5 is substantially a schematic diagram of another embodiment of the switch device of the present invention that utilizes a single source emitter.

As seen in FIG. 5, the present invention comprises an alternative embodiment generally indicated by reference number 426. As incoming light 432 enters switch element 426, it is directed through focusing lens 436. In this embodiment, light 432 then falls on beam splitter 438. Beam splitter 438 reflects light 432 to detector array 442. Detector array 442 is adapted to detect signals in reflected light 432 and, as mentioned above, detector array 442 is capable of distinguishing different signals that are being transmitted by different sources. Detector 442 may generate electrical signals based on the light signals. The electrical signals are transmitted to switch controller 444.

Switch controller 444 may be similar to switch controller 44 with a microprocessor and memory (not shown). The microprocessor is adapted to determine the intended destination of light signals and route the signals to an appropriate fiber. As in the previous embodiment, conflicts or interferences between signals can be handled within switch element 426.

Switch element also comprises an emitter 456 that is adapted to constantly transmit light 458 over a period of time. The light is produced in a desired range of wavelengths. Light 458 is transmitted to lens 460, which is adapted to collimate the light. Light 458 may then pass through optional lenslet array 462, which is adapted to concentrate the light on individual modulators in modulator array 464. The individual modulators in modulator array 464 may be modulators that are well known in the art, such as lithium niobate modulators available from Ortel in Azusa, Calif. Modulator array 464 is in communication with controller 444, which may drive individual modulators to allow light to pass through the array. The position of the individual modulators corresponds to the position of targets for the light 458.

By driving an individual modulator to allow light to pass through the modulator at selected times, the modulator can produce an outgoing optical signal 428. The signal passes through beam splitter 438 and lens 436 and is transmitted to a predetermined target.

Micro-Electromechanical Mirrors Switch Element

The present invention also comprises an embodiment that utilizes micro-electromechanical mirrors (MEMs). MEMs are well known in the art, an example of which has been produced by Lucent Technologies in Murray Hill, N.J. MEMs are mirrors that may be selectively positioned in a plurality of positions. This allows the MEMs to reflect light transmitted from a source to a plurality of locations or targets. A plurality of MEMs may be placed in an array to switch light from a plurality of sources.

Figure 6:
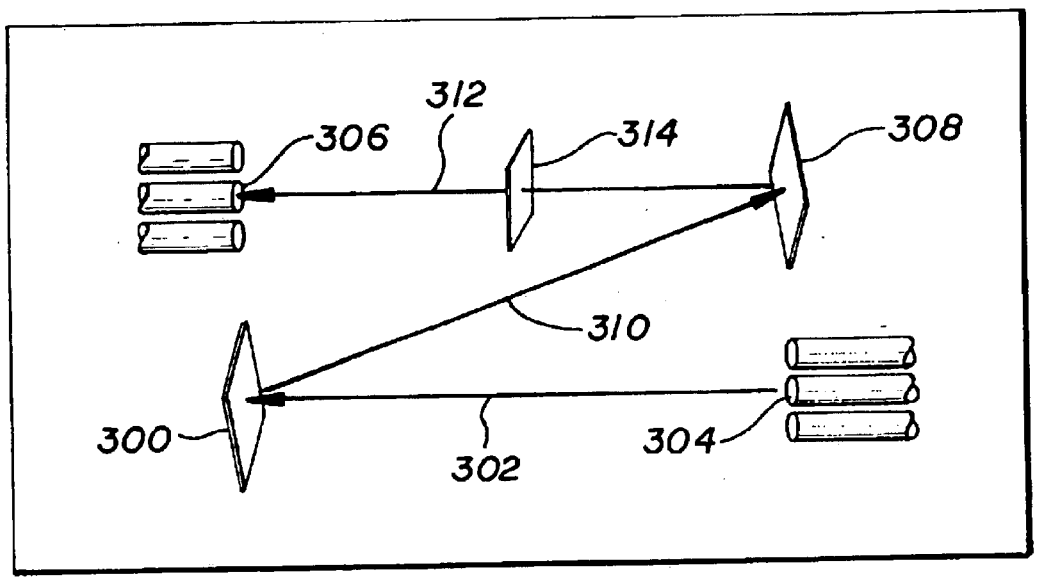
FIG. 6 is substantially a schematic diagram of a prior art switch device that utilizes two micro-electromechanical mirrors.

As seen in FIG. 6, MEMs can be used to switch light spatially using what is called a "3D" or "beamsteering" approach. In this approach, a first MEMs array 300 is positioned to receive a plurality of incoming parallel light beams 300, sometimes called "pencil beams," from a source or sources 304. Before light falls on a particular MEM, the MEM is positioned or aimed to reflect light along a selected path. The path of the light corresponds to a location of a particular target 306 among a plurality of targets.

For some targets, such as an optical fiber, it is desirable that light being transmitted to the target be substantially parallel to the normal axis of the target. If first MEM array 300 were to reflect light directly to a target, it may cause the light to be non-parallel to the normal axis of the target. This is so because each MEM on array 300 may not be aligned with the intended target and it is necessary to reflect light at an angle relative to the path of the incoming light. To address this problem, a second MEM array 308 is provided. First MEM array reflects light 310 to a MEM on second MEM array 308. The particular MEM on second MEM array 308 is aligned with the axis of the desired target 306 and the MEM is positioned so that light reflected by it is parallel to the preferred axis of the target.

A lenslet array 314, which may comprise an array of lenses, may be provided between second MEM array 308 and target 306 to focus the light on the respective target. A controller may also be provided (not shown) for controlling the position of the individual MEMs in the MEM arrays.

The present invention comprises embodiments that utilize MEMs to switch optical signals. These embodiments utilize polarization of light signals to selectively reflect and transmit light. Polarization is a well-known property of light. There are two polarization states, typically denoted x and y, in which the electric field of the light oscillates in the x or y direction, respectively, as it propagates in the z direction. Such light is called linearly polarized x or y light, respectively.

Light of different polarizations can be superposed, i.e., added, so that states of polarization ax+by are possible. Furthermore, a and b can be complex; a complex part denotes a phase lag or lead between the two possible states. In particular, a polarization state x+iy, $i=(-1)^{1/2}$, corresponds to a polarization state that rotates in the positive angle sense as it propagates and therefore is called right-circularly polarized. The state x−iy corresponds to rotations of the electric field that rotates in the negative angle sense, and is called left-circularly polarized.

Light can be switched from one polarization state to another using half-wave and quarter-wave wave plates, which are well known to those skilled in the art. A quarter-wave plate applies an additional factor of i (one-quarter of a full wave) to the y state, converting x+y to x+iy, or converting x+iy to x−y. Similarly, a half-wave plate applies a factor of −1 (one half of a full wave) to the y component, converting x+y to x−y. These facts are used in the embodiments described below.

Additionally, it is well known to those skilled in the art that polarizing beam splitters can reflect one linear polarization, for example, x, and transmit the second linear polarization state, y. These devices may be used to reflect or transmit light depending on the polarization of the light.

Figure 7:
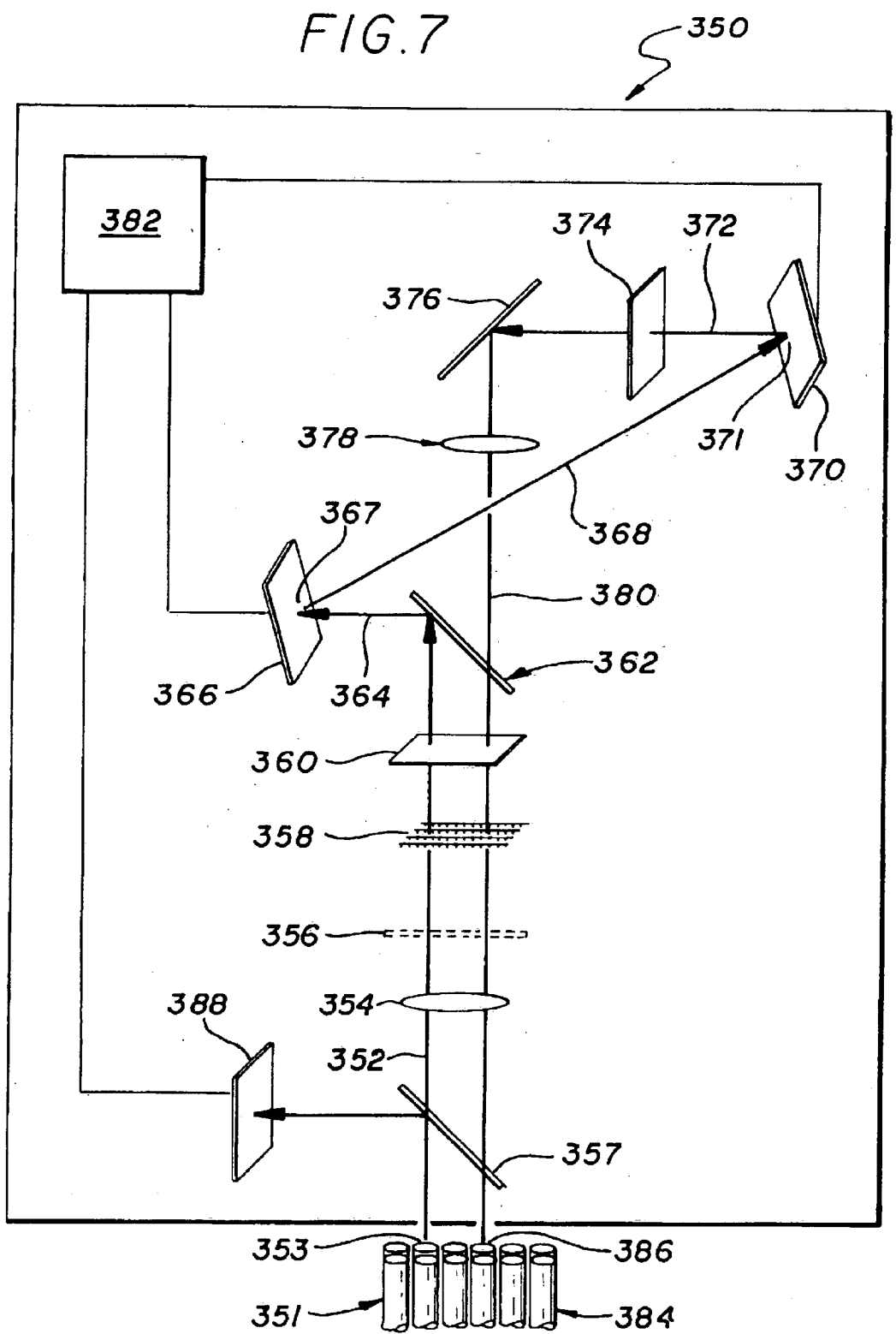
FIG. 7 is substantially a schematic diagram of another embodiment of the switch device of the present invention that utilizes two micro-electromechanical mirrors and two wave plates.

Turning now to FIG. 7, the present invention also comprises an alternative switch element generally indicated by reference number 350. Circularly polarized light 352 is transmitted by source 353. In the example calculations that follow, incoming light 352 is assumed to be right polarized light. Light 352 passes through lens 354, which focuses the light onto image plane 356. The light is allowed to diverge from the image plane until the light from the individual sources is of a size that matches the size of the individual micro-mirrors on MEMs array 366. Light 352 then passes through a lenslet array 358 that is adapted to collimate the light, i.e., make it into a "pencil beam" that neither diverges nor converges.

A beam splitter 357 may be provided in the path of incoming light 352 to reflect a portion of the incoming light to a detector array 388. Detector array 388 is adapted to convert the light signal to electrical signals and transmit the signals to controller 382. Controller 382, similar to controllers in the embodiments discussed above, is adapted to determine the destination of the incoming signal and drive MEM arrays 366 and 370 to route the signal to the appropriate target 386. As described above, each optical signal may be provided with a header that allows controller 382 to determine the destination of the signal. A time gap may be provided between the header and the rest of the signal to provide sufficient time for controller 382 to determine the destination and drive particular MEMs in MEM arrays 366 and 370 to their desired angular positions.

After passing through lenslet array 358, light 352 passes through λ/4 plate 360. This converts the right-circularly polarized light from a state x+iy to x−y. The state x−y is a purely linearly polarized state of light in a 45 degree direction, and will be denoted by x'. A properly oriented polarizing beam splitter 362 will then reflect the x'-polarized light to MEM array 366.

Reflected light 364 is transmitted to a particular MEM 367 that is aligned with the particular source 353 that emitted incoming light 352. MEM 367 is angularly positioned by controller 382 to reflect the light to a particular MEM 371 on MEM array 370. MEM 371 is aligned with a particular target 386 in a plurality of targets 384. It is recognized that targets 384 may be the same devices as sources 351. MEM 371 is angularly positioned by controller 382 to reflect incoming light 368 to target 386. The angular position of MEM 371 depends on the position of MEM 367 on MEM array 366. MEM arrays 366 and 370 are oriented so that the light passes through free space in this embodiment.

Reflected light 372 then passes through a λ/2 plate, which converts the polarization of the incident light from x'=x−y to y'=x+y, which is an orthogonal to x'. The light is then reflected by mirror 376. Reflected light 380 passes through lens 378, which acts to image the input lenslet array to the output lenslet array. Light 380 then passes through, if necessary, polarizing beam splitter 362. After passing through polarizing beam splitter 362 by virtue of its y' polarization, it then returns to the original λ/4 plate, which converts the y'=x+y polarized light to a polarization state x+iy, i.e., identical to the original input polarization state. Light 380 then exits the switching element the same way it came in, and proceeds to target 386.

Figure 8:
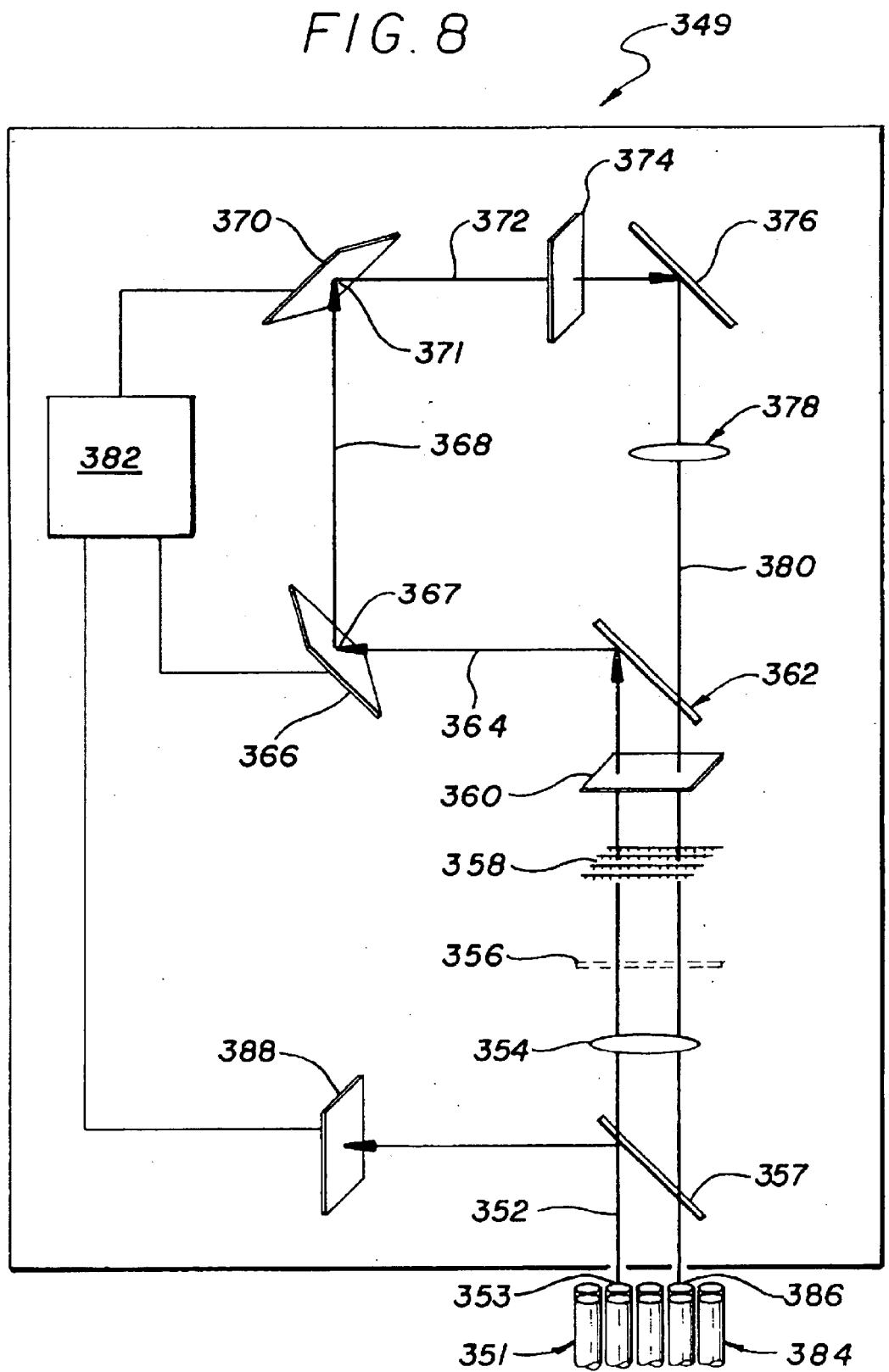
FIG. 8 is substantially an alternate configuration of the embodiment illustrated in FIG. 7.
Figure 9:
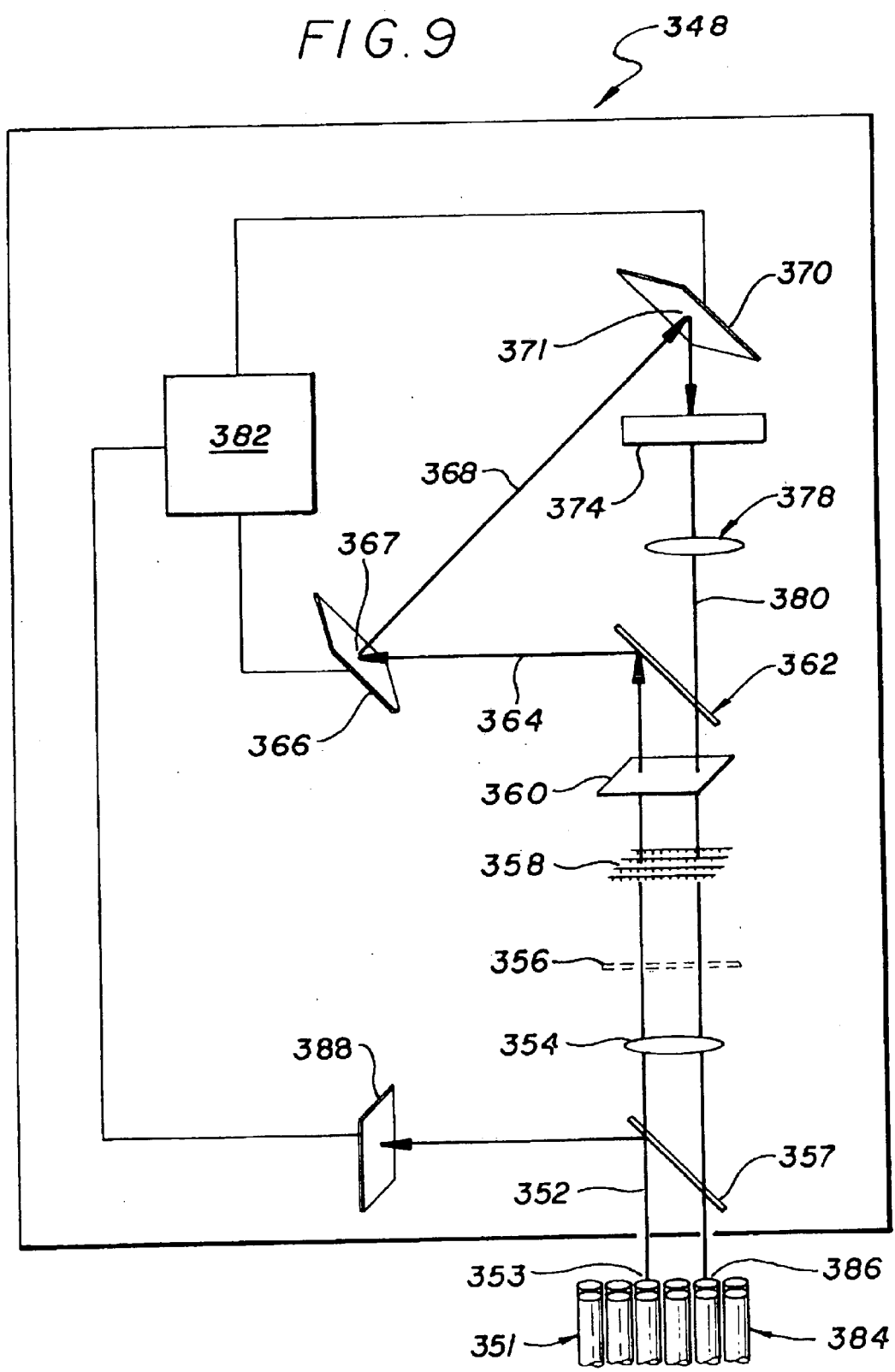
FIG. 9 is substantially an alternate configuration of the embodiment illustrated in FIG. 7.

FIGS. 8 and 9 illustrate embodiments that operate in substantially the same way as the embodiment illustrated in FIG. 7. In the embodiment shown in FIG. 8, MEM array 370 is on the same side of switch element 349 as MEM array 366. In switch element 348 in FIG. 9, MEM array 370 is positioned in line with polarizing beam splitter 362 and targets 384. Thus, mirror 376 (seen in FIGS. 7 and 8) is not required.

Figure 10:
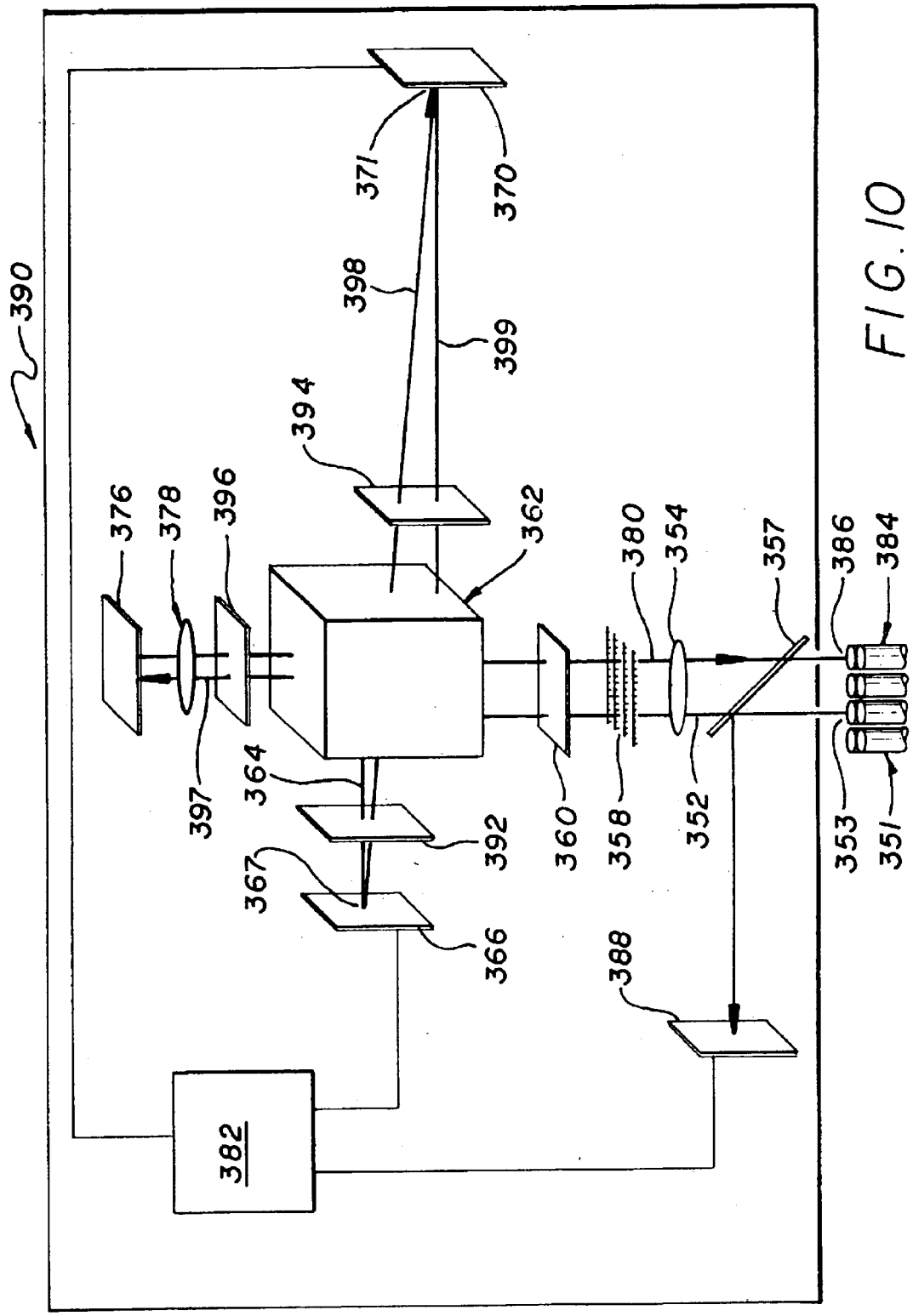
FIG. 10 is substantially an alternate configuration of the embodiment illustrated in FIG. 7 that utilizes four wave plates.

FIG. 10 illustrates an embodiment that utilizes four λ/4 plates 360, 392, 394, and 396. Light 352 is focused, converted, reflected as described above. However, a λ/4 plate 392 between beam splitter 362 and MEM array 366 is used to convert the polarization state from x'=x−y to x−iy. Light 364 impinges on MEM array 366 as before and then propagates back through quarter-wave plate 392, which then converts the polarization from x−iy to x+y=y'. Thus, light 398 becomes orthogonally polarized and passes through polarizing beam splitter 362 to MEM array 370.

Individual beams are directing the light in many different directions after being reflected by MEM array 366, and if these directions are larger than about 10 degrees from normal incidence at quarter-wave plate 392 and at polarizing beam splitter 362, significant errors in the polarization state of the light may occur. Thus, reflection angles are limited in this embodiment to less than about 10 degrees from normal incidence.

After light 398 passes through polarizing beam splitter 362, the light passes through a third quarter-wave plate 394 that converts the polarization state from y'=x+y to x+iy. The light 398 then proceeds to MEM array 370, which performs the same functions as in the previous embodiments. Reflected light 399 passes through the third quarter-wave plate 394 where its polarization state is changed from x+iy to x'=x−y.

By virtue of this new polarization state, the light is now reflected by the polarizing beam splitter upwards towards a fourth quarter-wave plate 396 that converts the polarization state from x'=x−y to x−iy. Light 397 then passes through lens 378, reflects from mirror 376 back through the lens. Lens 378 focal length is chosen so that the double transmission of the light results in imaging lenslet array 358 onto it self, similar to what was done in the embodiment shown in FIG. 7.

Light is again incident on fourth λ/4 plate 396, which now converts the polarization state from x−iy to y'=x+y. By virtue of this new polarization state, light 380 transmits through polarizing beam splitter 362 and then passes out switching element 390 in the same manner as described in the previous embodiment.

Two-dimensional MEM Switch Element

Figure 19:
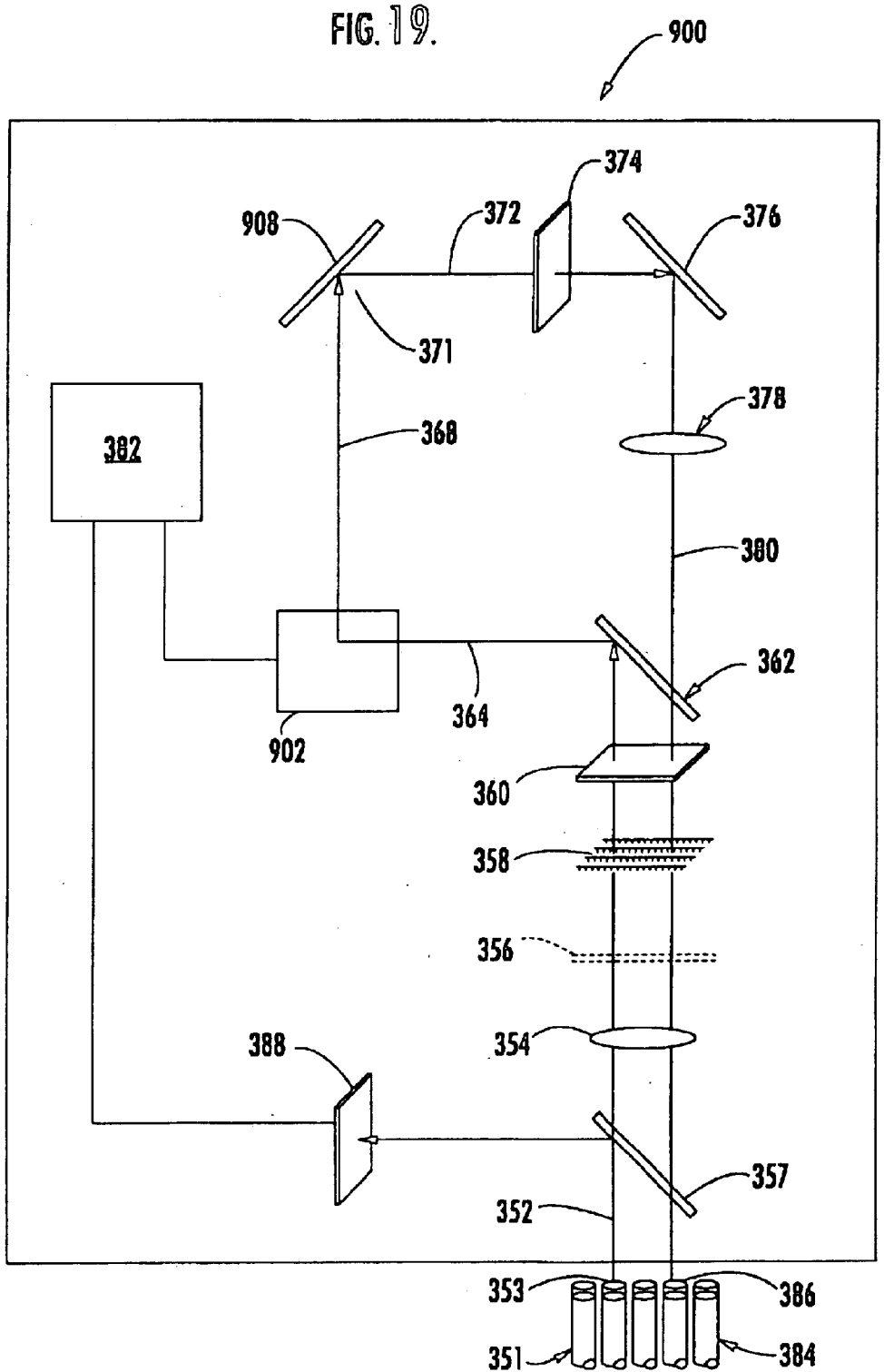
FIG. 19 is substantially another configuration of the embodiment illustrated in FIGS. 7–10 that utilizes one micro-electromechanical mirror.

FIG. 19 discloses an alternative preferred embodiment that utilizes a "two-dimensional" direction altering device. As in previous embodiments, source 353 transmits incoming light signal 352. A portion of incoming light 352 is transmitted by beam splitter 357 through lens 354, which focuses the light onto image plane 356. The light is allowed to diverge from the image plane until the light from the individual sources is of a desired size. Light 352 then passes through a lenslet array 358 that is adapted to collimate the light, i.e., make it into a "pencil beam" that neither diverges nor converges. After passing through lenslet array 358, the light is reflected by beam splitter 362 to a direction altering device 902. Direction altering device 902 may be a number of devices that are known in the art for redirecting light, such as MEMs, bubbles of gas, or acousto-optic devices. In the description of the embodiment that follows, the direction altering device 902 shall be referred to as a MEM array.

A portion of incoming light 352 may be reflected by beam splitter 357 to detector array 388. Detector array 388 is adapted to convert the light signal to electrical signals and transmit the signals to controller 382. Controller 382, similar to controllers in the embodiments discussed above, is adapted to determine the destination of the incoming signal and drive MEM arrays 902 to route the signal to the appropriate target 386. As described above, each optical signal may be provided with a header that allows controller 382 to determine the destination of the signal. A time gap may be provided between the header and the rest of the signal to provide sufficient time for controller 382 to determine the destination and drive a particular mirror in MEM array 902 to a reflective position.

Figure 20:
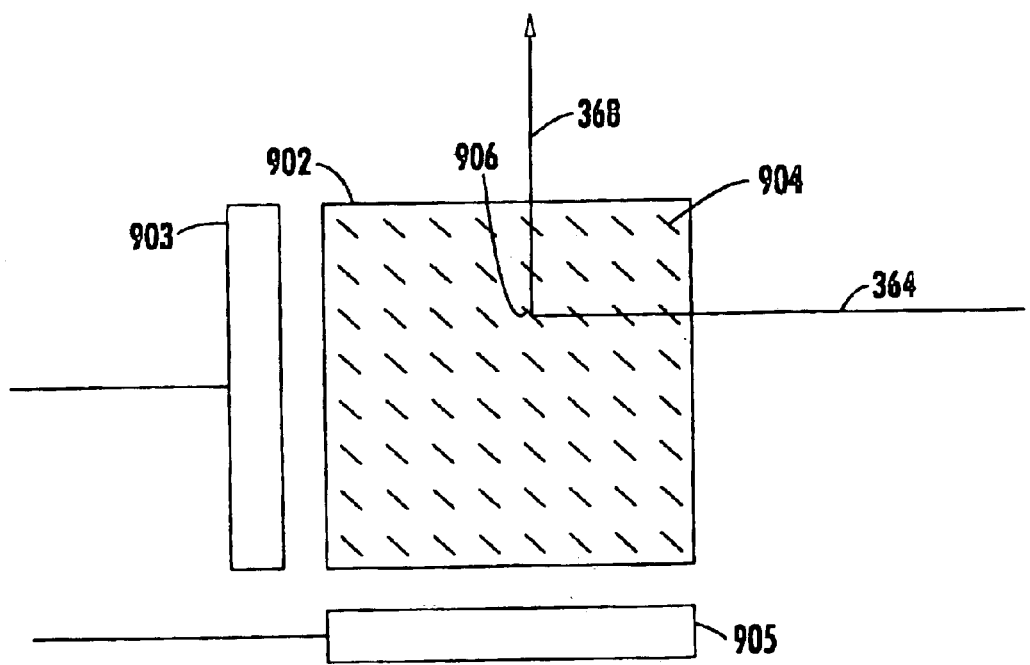
FIG. 20 is substantially a detailed schematic diagram of one embodiment of a "two-dimensional" micro-electromechanical mirror that may be used with the present invention.
Figure 21:
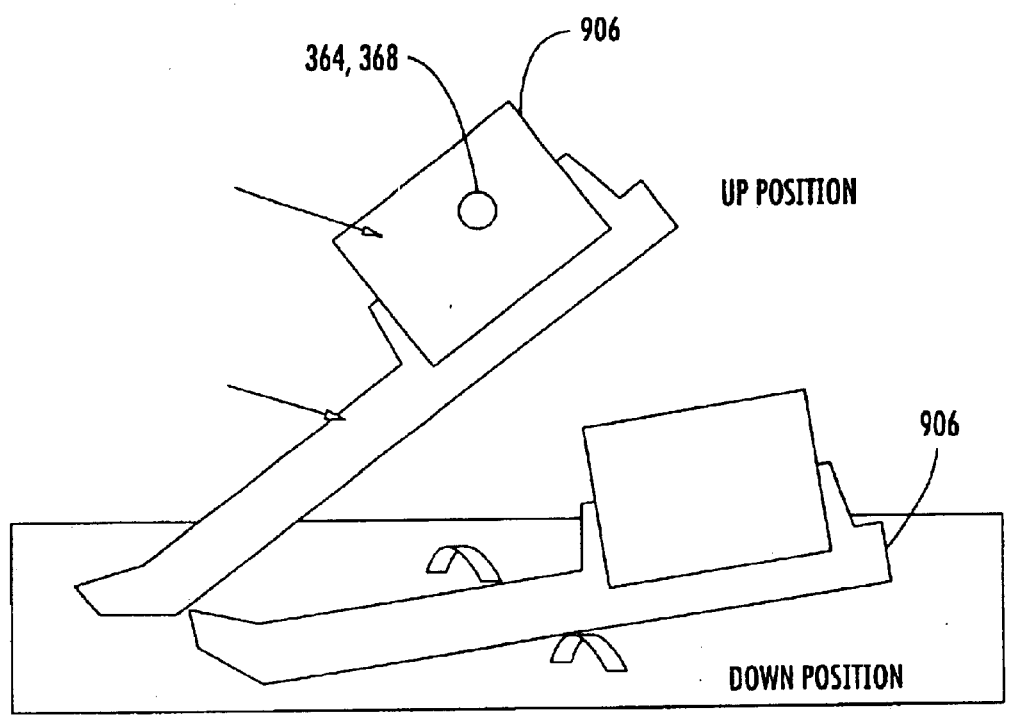
FIG. 21 is substantially a detailed schematic diagram of one embodiment of a mirror element of a micro-electromechanical mirror that may be used with the present invention.

In this embodiment, MEM array 902 is a so called "two-dimensional" array. Two dimensional MEM arrays are well known in the art, a discussion of which can be found in IEEE Communications Magazine, March 2002, by Dobbelaere, Falta, Fan, Gloeckner, and Patra. As seen in FIGS. 20 and 21, incident light 364 travels in a plane that is parallel to the substrate of MEM 902. All except one of the individual mirrors 904 in a row are in a down or lowered position, thereby allowing light 364 to pass over them. However, controller 382 has selected one of the mirrors 906 to reflect the light. Selected mirror 906 corresponds with the position of one or more targets 386.

As seen in FIG. 21, controller 382 causes selected mirror 906 to move from a down position to an up or active position where it can reflect incident light 364. Selected mirror may be actuated using a number of different methods and devices, such as comb drives, thermal expansion actuators, electrostatic scratch drive actuators, and gap-closing electrostatic actuators.

In the example shown in FIGS. 19 and 20, light is reflected in a 90 degree angle. However, MEM array 902 may be designed to reflect light in different angles and the architecture of switch element 900 may be modified accordingly.

Additionally, if all the mirrors in a row of two-dimensional MEMs 902 of FIG. 20 are in the lowered position, the incident light will pass over the entire array and can be detected by a detector 903 with suitable optics at the far side of the substrate. This particular operation is referred to as "dropping a channel," and may be of benefit in some cases. If all the mirrors in a column of two-dimensional MEMs 902 of FIG. 20 are in the lowered position, light can be injected from a source into the outgoing path at that column by an emitter array 905 with suitable optics at the lower side of the substrate. This particular operation is referred to as "adding a channel," and may be of benefit in some cases. Both detector 903 and emitter 905 are in communication with controller 382, which is adapted to read the detected signals and cause emitter 905 to emit appropriate signals.

Reflected light 368 is transmitted to mirror 908. The light is then reflected by mirror 376. Reflected light 380 passes through lens 378, which acts to image the input lenslet array to the output lenslet array. Light 380 then passes through beam splitter 362, lenslet array 358, lens 354 and beam splitter 357. Light 380 then exits the switching element to target 386.

As in disclosed in previous embodiments, $\lambda/4$ plates 360 and 374 may be provided for allowing bi-directional communication. If $\lambda/4$ plates 360 and 374 are used, beam splitter 362 would be a polarizing beam splitter that reflects light in one polarization and transmits light in another polarization.

Similar to the embodiment disclosed in FIGS. 7–10, switch element 900 may be utilized in an array of switch elements (not shown in FIG. 19). A dichroic beam splitter may be provided between the switch element 900 and sources 353 to reflect light of a predetermined wavelength to the switch element and to transmit light not in the predetermined wavelength to other switch elements.

Positioning and Alignment of Switch Device

Figure 11:
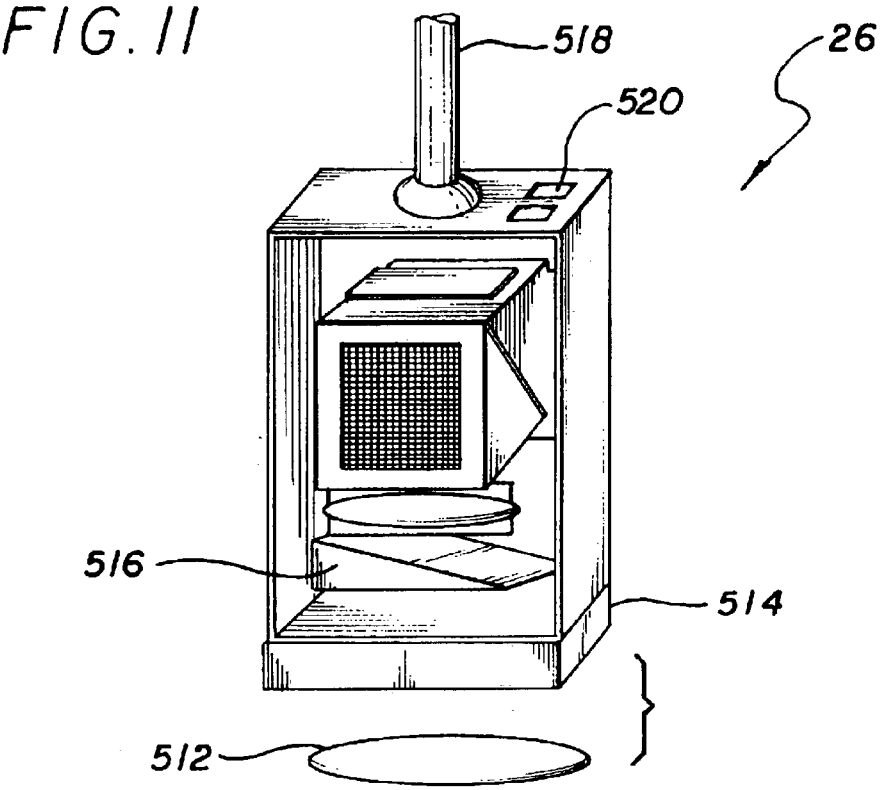
FIG. 11 is substantially schematic diagram of one embodiment of the switching element of the present invention.

Returning to FIG. 1, switch elements 26 and fibers 14 are preferably arranged substantially vertically so that switching elements 26 and fiber bundle 12 can be inserted vertically. The vertical configuration is advantageous for ease of access to switching elements 26 and for ease of alignment. Referring to FIG. 11, this is accomplished by providing each switch element 26 with a 3-point kinematic alignment unit 514. Alignment unit 514 may comprise a prism 516, positioned between the focusing lens 512 and an associated switch element 26. Prism 516 is used to redirect the incident light to vertical for the embodiment shown in FIG. 1, and will not cause significant chromatic dispersion because the light has a very narrow spectral bandwidth as it enters each switching element 26. In this embodiment, a power and data cable 518 is attached to switch element 26 at a point that is directly above the center of gravity of the switch element. This helps reduce the effect of forces imparted by power cable 518. Wireless data ports 520 may also be provided, thereby eliminating the need for a physical data connection.

In terms of structural positioning, some specific numbers determine the configuration of switch device 10. First, the required nominal angle of incidence of an incoming signal is approximately 3.0 degrees to maintain a 0.4 nm of spectral shift or less for a bandpass filter designed for normal incidence at 1500 nm mean wavelength. Within this 3 degrees, contributions come from the nominal incidence angle as well as from off-axis propagation of the light from the various optical carriers 14. Consider, for example, a situation where a circular fiber bundle 14 is 64 fibers across and each fiber is separated by 100 microns. The resulting radius (r) of the bundle 12 is 3.2 millimeters. The light from this bundle 12 is collimated to about 1 centimeter beam radius (w) because the fiber numerical aperture (NA) is about 0.1. The required focal length (f) of the collimating lens 24 is about w/NA=10 cm. The greatest off-axis angle at collimating lens 24 is, therefore, about r/f=0.032 radians, i.e., about 1.9 degrees. This then leaves an angle $\theta$ of about 1.1 degrees, worst case, for the nominal pointing angle. Using 1.1 degrees as the angle of incidence on the bandpass filters 30 results in a 2.2-degree full angle ($\theta$) between incident and reflected light. At this angle and with the imaging lenses 25 fitting with a 20% margin, results in a length of $1.2*w/(\theta*\pi/180)=32.1$ cm from imaging lens 25 to each bandpass filter 30. Hence, the total length is about double, i.e., 64.2 cm, between mirrors 27 and bandpass filter 30. This length can be reduced if additional signal loss can be tolerated. Focusing lens 25 can conveniently be selected to have a focal length equal to the separation from the lens 25 to corresponding bandpass filter 30. Each switching element 26, including detector, emitter, and beam splitter, preferably occupies a region that is about 100 cubic cm or less.

Figure 12:
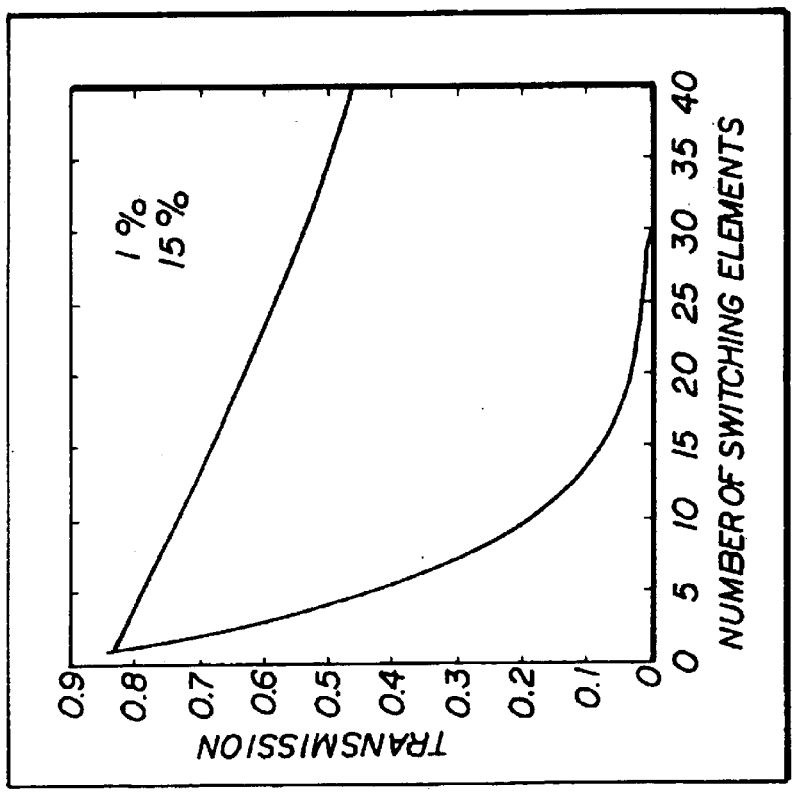
FIG. 12 is substantially a graphical representation of the transmission loss of the embodiment of FIG. 1.

Using the above-described approach, a large number of wavelength bands can be sequentially demultiplexed. The limiting effects in this embodiment are beam quality and transmission losses. As shown in FIG. 12, for each switching element 26, six (6) surfaces are encountered. Each of the surfaces may have 0.1% transmission loss or less, based on modern manufacturing capabilities, except for bandpass filters 30, which typically have about 15% loss in transmission, and about 1% loss in reflection. Hence, the loss versus number of switching elements M in sequence is $0.85 \times (0.9995^5 \times 0.99)^M$. A plot of the signal transmission versus number of switch elements M is given in FIG. 12, as well as a case in which the filters have a much worse loss of 15% per element upon reflection. From FIG. 12, it can be seen that even as many as 35 switching elements can be sequenced with less than 3 dB loss for all elements, for the nominal 1% per filter. On the other hand, if each filter loses 15%, only about 14 switching elements can be sequenced with less than 10 dB loss for all elements.

Figure 13:
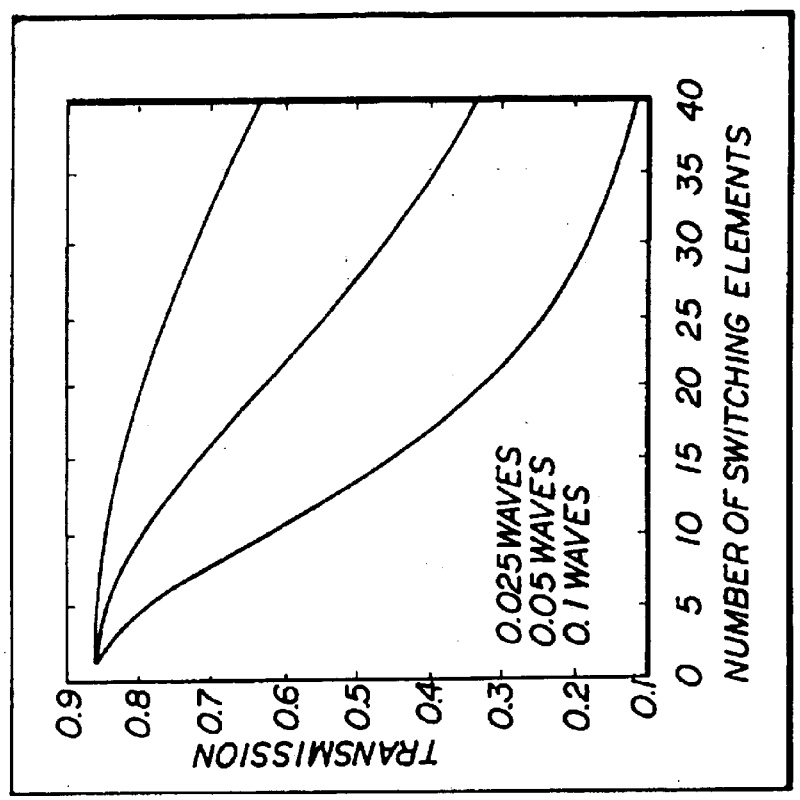
FIG. 13 is substantially a graphical representation of the wavefront quality impact on transmission of the embodiment of FIG. 1.

Beam quality is also an important issue in determining the number of switching elements 26 that can be sequenced. For the low-spatial-frequency aberrations expected for the 1 cm optics commonly in use, the formula for power loss is plotted in FIG. 13. For this plot, the following is assumed: 1) 0.1, 0.05, and 0.025 waves rms error per optical element, and 2) these errors combine in root mean square. It is also assumed that switch element detectors 42 are 30 microns in size, that the wavelength is 1.5 microns, and that the F/# of lens 36 is 10, in accord with the assumptions above. The results for 0.05 rms waves per optic, or better, will provide 3 dB of loss on average for the $28^{th}$ switching element. Less loss occurs for earlier switching elements in the sequence.

Overall, the combined effect of transmission and wavefront quality with the assumed values (0.05 waves or less, 1% or less for filters, 0.1% or less for other optics) leads to a 6 dB loss, or better, with 30 switching elements in sequence. The overall result is therefore that up to 30 switching elements may be sequenced with reasonable losses.

Figure 14:
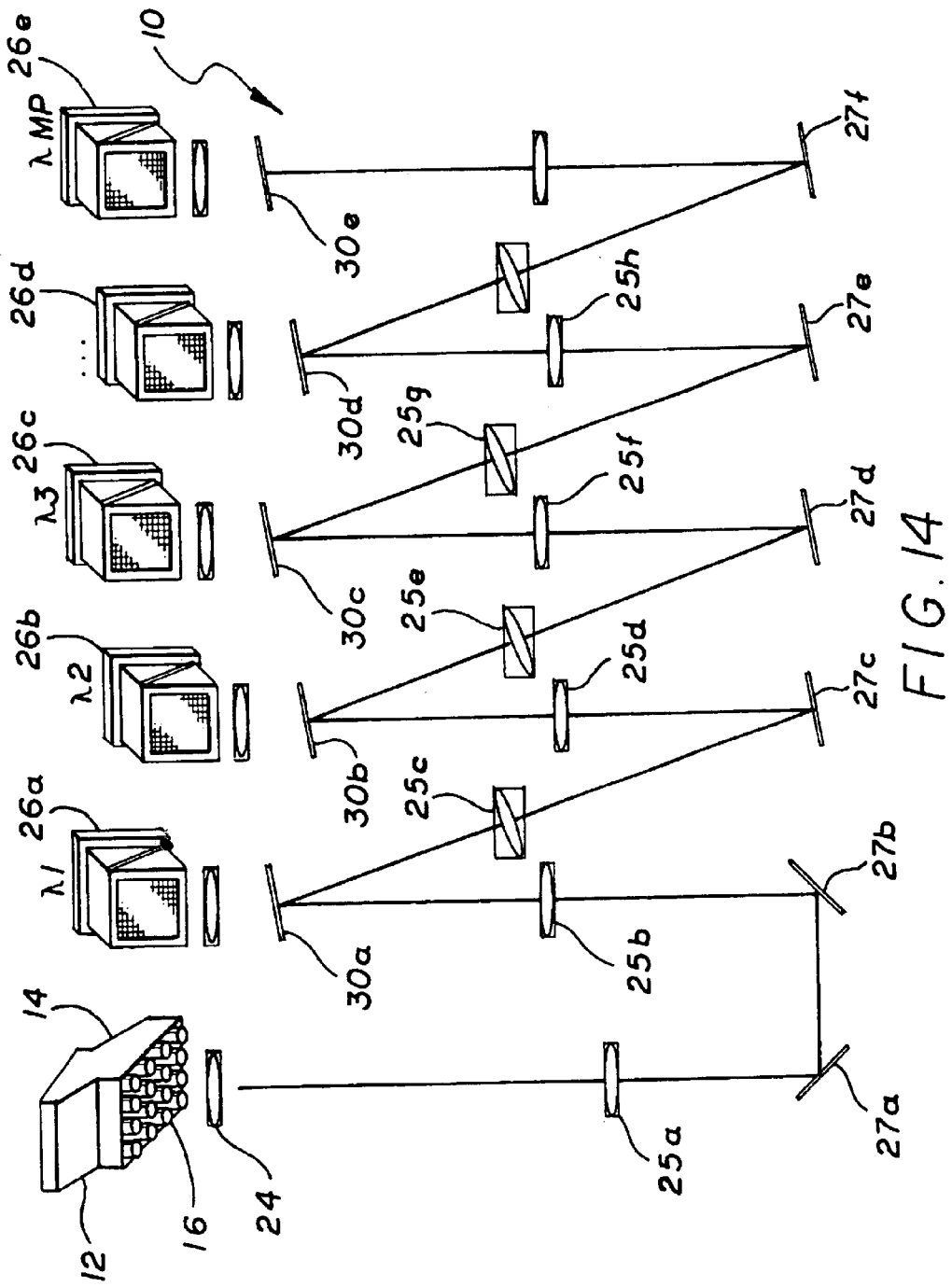
FIG. 14 is substantially a schematic diagram of another embodiment of the switching device of the present invention.

FIG. 14 illustrates an alternative configuration of switch device 10 in which each bandpass filter 30 is angled to receive the optical signal at a substantially non-normal incidence. In this case, each switching element 26 receives the optical signal from a substantially vertical direction, and, therefore, does not require prism 516 (see FIG. 11) for each switching element 26. However, this embodiment suffers from unsymmetrical paths between imaging lenses, which requires relocation of the imaging lenses in an arrangement that may be more difficult to align.

Figure 16:
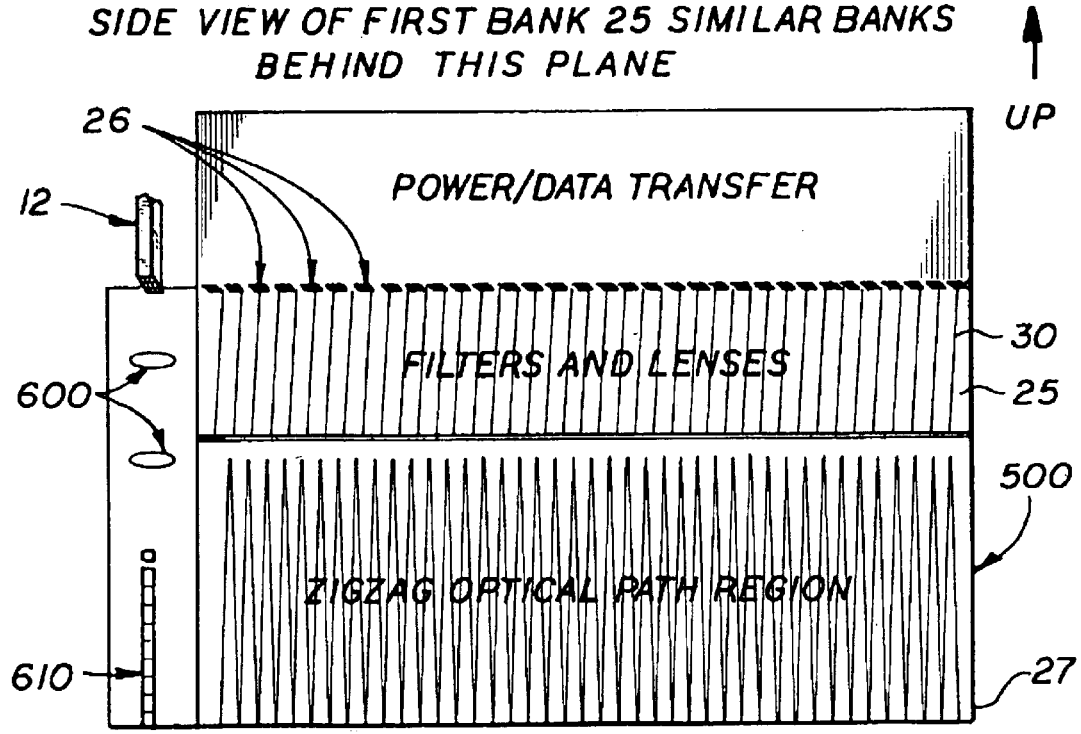
FIG. 16 is substantially a schematic diagram of one embodiment of an optical switching system of the present invention including a plurality of switching devices shown in FIG. 1 used in conjunction with demultiplexing device of FIG. 15.
Figure 15:
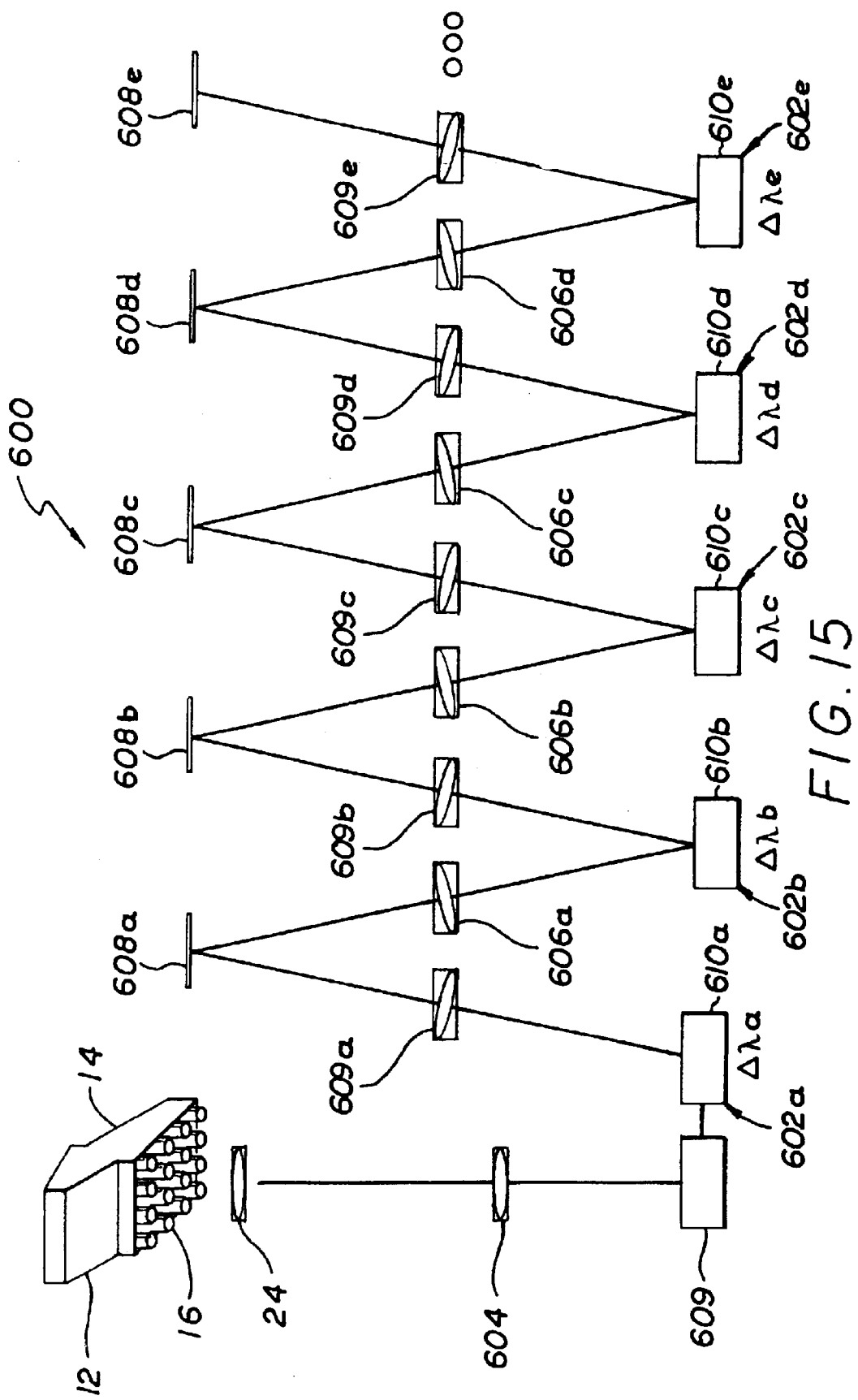
FIG. 15 is substantially a schematic diagram of one embodiment of a demultiplexing device of the present invention for use with a number of optical switching devices of FIG. 1.

Referring to FIGS. 15 and 16, the present invention includes system 600 that is adapted to perform wide band demultiplexing. System 600 directs optical signals having a predetermined range of wavelengths to an appropriate bank 500. Each bank 500 (similar to switch device 10 of FIG. 1) comprises a plurality of switching devices 26. System 600 includes a plurality of directing units 602. Each directing unit 602 includes a first imaging lens 604 and a second imaging lens 606, a mirror 608 for reflecting an optical signal from the first imaging lens 604 to the second imaging lens 606, and a bandpass filter 610. Each bandpass filter 610 is preferably a wide-band type filter configured to receive an optical signal from second imaging lens 606 and allow an optical signal within a predetermined range of wavelengths to pass through the bandpass filter to bank 500 of optical switches (see FIG. 16). An optical signal outside of the predetermined range of wavelengths is reflected to another, subsequent directing unit 602. Element 609 may be a bandpass filter or a fold mirror depending on the angular alignment tolerances of bandpass filter 610a.

Each bandpass filter 610 may divert, for example, groups of up to thirty (30) wavelengths. For instance, if the wavelength spacing between bands is 0.8 nanometers, then the total wavelength range for one group is 24 nanometers, and this entire group of thirty (30) wavelength bands is sent to one bank 500 of switch elements.

Clearly, this alternative embodiment will introduce additional losses, but because the filter 610 bandwidths are rather wide, the losses for sequencing in this case are less than that for the individual switching devices 500. In this way, many different wavelengths can be simultaneously switched. For example, as noted in FIG. 16, it is not unreasonable to use 25 different switching banks 500, with an associated additional 3 dB of loss for the furthest bank 500 (with signal regeneration, the signal strength can be arranged to be nearly equal for all the bands upon exiting the system). The combination of twenty-five (25) banks 500 and thirty (30) wavelengths per bank 500 leads to 750 wavelength bands. If 0.4 nanometers is used per band, the total bandpass used is 300 nm, which is essentially the entire telecommunications band from 1360 n to 1560 nm.

One layer of the resulting optical switching system 700 is shown schematically in FIG. 16. In this case, demultiplexing system 600 is oriented perpendicular to the individual switching devices 500. As indicated, a number of banks 500 may be located adjacent to one another (into the page). In this case, where twenty-five (25) banks 500 are provided, the overall system 700 occupies about 40 cm wide×85 cm high×125 cm long. The latter length assumes 5 cm of thickness per bank 500. Note that the system shown in FIG. 16 has a total of $\pi*32^2=3216$ input carriers, and 750 input wavelengths. If one assumes 10 Gigabits/sec input per wavelength, the resulting throughput is then 24 Petabits/sec. Accordingly, this embodiment has a tremendous capacity for switching or routing data.

Faraday Rotator Embodiment

Figure 17:
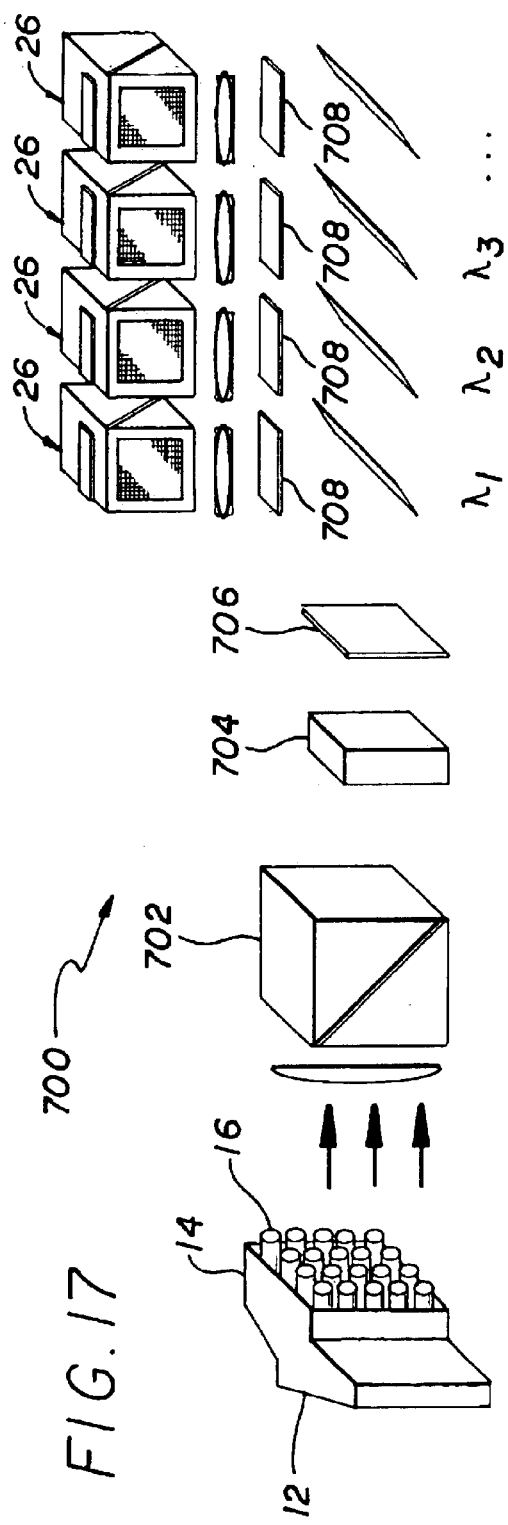
FIG. 17 is substantially a schematic diagram of one embodiment of an optical switch system of the present invention that utilizes an optical isolation subsystem.

In an alternative embodiment, polarization is more carefully controlled and used for added redundancy of processing. This is performed by placing a polarizing beamsplitter 702, a Faraday rotator 704, and one additional quarter-wave plate 706 between the input collimating lens and the rest of the system, as shown in FIG. 17. Polarizing beamsplitter 702 reflects one linear component, say x, and transmits the orthogonal linear component, y, into the switching system. The reflected light from the polarizer may be sent to a second, redundant switch array that is similar to the first array (the array 500 of FIG. 16, for example), and this second array is used to switch those signals for which the reflected light is stronger than the transmitted light, or to switch light in case of failures in the first switching array.

Faraday rotator 704 rotates the polarization of the light in polarization y to y'=x+y, and this light enters the first quarter-wave plate 706. λ/4 plate 706 then converts the light to right-circularly polarized light x+iy, which is then propagated to the relevant switch elements 26. In some embodiments, a second quarter-wave plate 708 is provided in front of each switch element 26. Second quarter-wave plate 708 will convert light to linear polarization x'=x−y. The linear polarization x' is then reflected or transmitted to a detector array or to a MEMs array. If an embodiment is used with detectors, light backscattered from the detectors will be predominately light of the same polarization and will therefore pass back through and out of the optical system. This is evident to those skilled in the art because of the combination of the polarizing beamsplitter and the Faraday rotator at the fiber array. Faraday rotator 704 and two quarter-wave plates 706 and 708 along the optical path are equivalent to a standard optical isolator comprising a polarizing beamsplitter, a Faraday rotator, and a half-wave plate.

Light emitted from the emitters, modulators, or exiting the MEMs arrays will pass back through the polarizer in the orthogonal polarization, y'=x+y. This light will then be converted by the quarter wave plate 708 at switch element 26 to right-circularly-polarized light x+iy. This light will then be transmitted back through the system to first quarter-wave plate 706 where it will be converted to polarization state x'=x−y. This light then passes through Faraday rotator 704 a second time and the light is converted to state −y by the rotator. This state of light is transmitted through the polarizer and then passes through the collimator on to the fiber array, as desired. Note that if the range of wavelengths are significant, then dispersion in first quarter-wave plate 706 may be an issue. Dispersion compensation can be added as needed by various means known to those skilled in the art.

In an embodiment where the intervening optics' properties vary significantly (>10%) with linear state of polarization, additional consideration is required. Typically, one polarization state is preferred over another. In such cases, the light transmitted through the optical system from fiber array 14 to switching elements 26 is put into the preferred linear polarization state. In this case, first quarter-wave plate 706 near Faraday rotator 704 is moved to the switching elements and combined with the quarter-wave plates 708 at the respective switching elements. The combination of the quarter-wave plates form half-wave plates at the respective switching elements for equivalent functionality.

Beam Contractor

Figure 18:
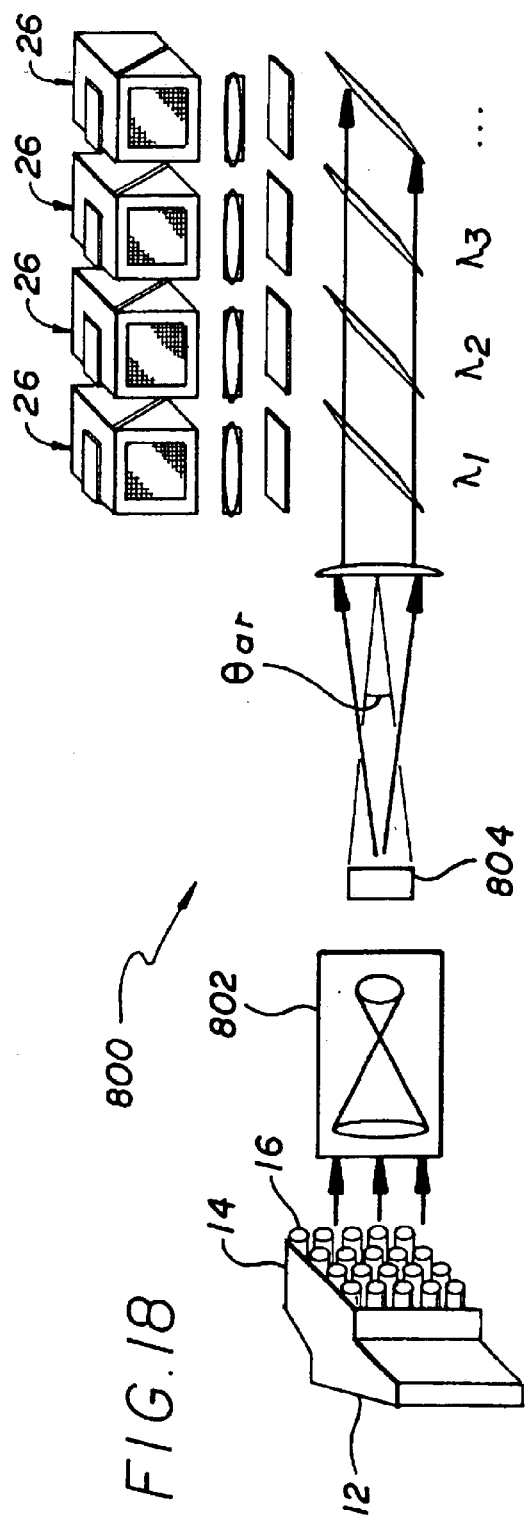
FIG. 18 is substantially a schematic diagram of one embodiment of an optical switch system of the present invention including a subsystem to adjust the apparent angular size of the fiber array and the apparent angular spacing of the fibers.

In another embodiment of the present invention, it is desired to put the fiber array into as small a region as possible to enable the system to achieve better imaging performance over the entire array. Because imaging performance is a function of field angle, it is desired to put the array into as small an angular region $\theta_{ar}$ as possible, as seen from the collimating lens. Some reduction of the extent of the array can be achieved by fiber packaging means. These packaging means are well known to those skilled in the art, and are produced by companies such as Haleos (web site www.haleos.com). On the other hand, much more flexibility in reduction can be achieved using optical system 800 shown in FIG. 18. In this Figure, a beam contractor 802 is used to form a small image of the fiber array, followed by a lenslet array 804 to adjust the numerical aperture of the light entering or exiting each fiber. Beam contractor 802 reduces the apparent width w of the array by a magnification factor M from the true width W, so that w=W/M.

Lenslet array 804 then adjusts the numerical aperture NA to NA1. The resulting focal length changes from L=r/(NA×M) to L1=r/NA1, where r is the clear radius of the lens, NA is the fiber numerical aperture, and NA1 is the adjusted numerical aperture. The resulting full angular extent of fiber array 14 is reduced from (W×NA)/r to (w×NA1)/r. This approach is used to reduce the apparent angular extent of fiber array 14 until the apparent angular separation of neighboring fibers is no less than about 3 times the diffraction limit of the collimating lens, in order to limit-fiber-to-fiber crosstalk. The diffraction limit is given by 1.22 λ/r, where λ is the longest wavelength of the light from the fiber array. As an example of the application of these techniques, assume that r=0.5 cm, and that λ=1.55 microns. The resulting needed angular separation is about 0.380 milliradians. Choose the full angular extent of the image of the fiber array, (w×NA1)/r, to be less than or equal to 2 degrees for best imaging performance. The resulting number of fibers across the imaged region is then (2 degrees)×(17 milliradians per degree)/0.38 milliradians=90 fibers across the diameter. The corresponding number of fibers that fit within a circular aperture with a diameter of 90 fibers is equal to 6360. Assuming switching between 6360 fibers and 750 wavelength and 10 Gbps per wavelength, one finds that routing of 47.7 Petabits per second of data can be supported with this optical architecture.

CONCLUSION

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. An optical switch element for use with at least one source, the source being adapted to transmit an optical signal to the optical switch element, and a plurality of targets, the targets being adapted to receive the optical signal from the optical switch device, the optical switch device comprising:
   (A) a beam splitter, the beam splitter being adapted to transmit light in a first predetermined polarization and reflect light in a second predetermined polarization;
   (B) a first wave plate positioned on an optical path between the source and the beam splitter, the first wave plate being adapted to alter polarization of the light transmitted by the source so that it is reflected by the beam splitter, wherein light transmitted by the source passes through the wave plate and is reflected by the beam splitter;
   (C) a micro-electromechanical mirror positioned to receive light reflected by the beam splitter, the micro-electromechanical mirror being adapted to selectively reflect light in a plurality of paths, the paths corresponding to the positions of the plurality of targets;
   (D) a second wave plate positioned on an optical path between the micro-electromechanical mirror and the beam splitter, the second wave plate being adapted to alter polarization of the light reflected by the micro-electromechanical mirror so that it is transmitted by the beam splitter, wherein light reflected by the micro-electromechanical mirror passes through the second wave plate and is transmitted by the beam splitter.

2. The optical switch element of claim 1, further comprising a controller in communication with the micro-electromechanical mirror, the controller being adapted to determine a target for an optical signal and cause the micro-electromechanical mirror to reflect the signal to the target.

3. The optical switch element of claim 2, further comprising a detector positioned to receive light from the source and in communication with the controller, the detector being configured to allow the controller to receive information from an optical signal.

4. The optical switching element of claim 1, further comprising a lenslet array between the source and the beam splitter, the lenslet array being adapted to transmit collimated light to the first micro-electromechanical mirror.

5. The optical switching element in claim 4, further comprising a lens positioned between the micro-electromechanical mirror and the lenslet array, wherein light reflected by the micro-electromechanical mirror is imaged on the lenslet array.

6. The optical switch element of claim 1, wherein the micro-electromechanical mirror is a two-dimensional micro-electromechanical mirror.

7. An optical switch device, comprising:
   (A) at least one source, the source being adapted to transmit an optical signal;
   (B) a plurality of targets, the targets being adapted to receive the optical signal; and
   (C) at least a first and second switch element, each switch element comprising a micro-electromechanical mirror positioned to receive light from the source, the micro-electromechanical mirror being adapted to selectively reflect light in a plurality of paths, the paths corresponding to the positions of the plurality of targets; and (D) a beam splitter positioned to reflect optical signals to the micro-electromechanical mirror of the first switch element, the beam splitter being adapted to reflect light within a predetermined range of wavelengths and allow light outside of the predetermined range of wavelengths to pass through the beam splitter, the second switch element being positioned to receive optical signals that pass through the beam splitter and transmit optical signals to the plurality of targets.

8. The optical switch device of claim 7, wherein each switch element further comprises a controller in communication with the micro-electromechanical mirror, the controller being adapted to determine a target for an optical signal and cause the micro-electromechanical mirror to reflect light to the target.

9. The optical switch device of claim 8, wherein each switch element further comprises a detector positioned to receive light from the source and in communication with the controller, the detector being configured to allow the controller to obtain information from an optical signal.

10. The optical switch device of claim 7, wherein each switch element further comprises:

(A) a beam splitter, the beam splitter being adapted to transmit light in a first predetermined polarization and reflect light in a second predetermined polarization;

(B) a first wave plate positioned on an optical path between the source and the beam splitter, the first wave plate being adapted alter polarization of the light transmitted by the source so that it is reflected by the beam splitter, wherein light transmitted by the source passes through the wave plate and is reflected by the beam splitter; and (C) a second wave plate positioned between the micro-electromechanical mirror and the beam splitter, the second wave plate being adapted to alter polarization of the light reflected by the micro-electromechanical mirror so that it is transmitted by the beam splitter, wherein light reflected by the micro-electromechanical mirror passes through the second wave plate and is transmitted by the beam splitter.

11. An array of optical switch elements, the array comprising:

(A) at least a first and second switch element, each switch element comprising a micro-electromechanical mirror positioned to receive light from a source, the micro-electromechanical mirror being adapted to selectively reflect light into a plurality of paths, the paths corresponding to the positions of a plurality of targets; and (B) a beam splitter, the beam splitter being adapted to reflect light of a predetermined wavelength and allow light outside of the predetermined wavelength to pass through the beam splitter, the beam splitter being positioned to reflect light transmitted by a source to the micro-electromechanical mirror of the first switch element, the micro-electromechanical mirror of the second switch element being positioned to receive light that passes through the beam splitter.

12. The optical switch device of claim 11, wherein each switch element further comprises a controller in communication with the micro-electromechanical mirror, the controller being adapted to determine a target for an optical signal and cause the micro-electromechanical mirror to reflect light to the target.

13. The optical switch device of claim 12, wherein each switch element further comprises a detector positioned to receive light from the source and in communication with the controller, the detector being configured to allow the controller to obtain information from an optical signal.

14. The optical switch device of claim 11, wherein each switch element further comprises:

(A) a beam splitter, the beam splitter being adapted to transmit light in a first predetermined polarization and reflect light in a second predetermined polarization;

(B) a first wave plate positioned on an optical path between the source and the beam splitter, the first wave plate being adapted to alter polarization of the light transmitted by the source so that it is reflected by the beam splitter, wherein light transmitted by the source passes through the wave plate and is reflected by the beam splitter; and (C) a second wave plate positioned on an optical path between the micro-electromechanical mirror and the beam splitter, the second wave plate being adapted alter polarization of the light reflected by the micro-electromechanical mirror so that it is transmitted by the beam splitter, wherein light reflected by the micro-electromechanical mirror passes through the second wave plate and is transmitted by the beam splitter.

15. A method of switching optical signals, the method comprising the following steps:

(A) providing at least a first and second switch element, each switch element comprising a micro-electromechanical mirror positioned to receive light from a source, the micro-electromechanical mirror being adapted to selectively reflect light in a plurality of paths, the paths corresponding to the positions of a plurality of targets;

(B) causing light of a predetermined range of wavelengths to be received by the first switch element;

(C) causing light outside of the predetermined range of wavelengths to be received by the second switch element;

(D) determining a target to which to transmit the optical signal; and (E) causing the micro-electromechanical mirror in at least one of the switch elements to reflect the optical signal along a path, the path of the reflected optical signal corresponding to a position of a target, wherein the optical signal is transmitted to the target.

16. The method of claim 15 further comprising:

(A) wherein at least one of the first and second switch element further comprises a beam splitter, the beam splitter being adapted to transmit light in a first predetermined polarization and reflect light in a second predetermined polarization;

(B) causing the optical signal to be polarized in the first predetermined polarization wherein the optical signal is reflected by the beam splitter to the micro-electromechanical mirror; and (C) causing the optical signal to be polarized in the second predetermined polarization, wherein light reflected by the micro-electromechanical mirror is transmitted by the beam splitter.

17. An optical switch element for use with at least one source, the source being adapted to transmit an optical signal to the optical switch element, and a plurality of targets, the targets being adapted to receive the optical signal from the optical switch device, the optical switch device comprising:

(A) a beam splitter, the beam splitter being adapted to transmit light in a first predetermined polarization and reflect light in a second predetermined polarization;

(B) a first wave plate positioned on an optical path between the source and the beam splitter, the first wave plate being adapted to alter polarization of the light transmitted by the source so that it is reflected by the beam splitter, wherein light transmitted by the source passes through the wave plate and is reflected by the beam splitter;

(C) a direction-altering device positioned to receive light reflected by the beam splitter, the direction-altering device being adapted to selectively direct light in a plurality of paths, the paths corresponding to the positions of the plurality of targets;

(D) a second wave plate positioned between the direction-altering device and the beam splitter, the second wave plate being adapted to alter polarization of the light directed by the direction-altering device so that it is transmitted by the beam splitter, wherein light directed by the direction-altering device passes through the second wave plate and is transmitted by the beam splitter.

18. The optical switch element of claim 17 wherein the direction-altering device comprises a micro-electromechanical mirror.

19. The optical switch element of claim 17 wherein the direction-altering device comprises a gas bubble device.

* * * * *